US007760409B2

(12) United States Patent
Yamaguchi

(10) Patent No.: US 7,760,409 B2
(45) Date of Patent: *Jul. 20, 2010

(54) OPTICAL BEAM SCANNING APPARATUS AND IMAGE FORMING APPARATUS

(75) Inventor: Masao Yamaguchi, Katsushika-ku (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/211,846

(22) Filed: Sep. 17, 2008

(65) Prior Publication Data

US 2009/0015898 A1 Jan. 15, 2009

Related U.S. Application Data

(63) Continuation of application No. 11/694,532, filed on Mar. 30, 2007, now Pat. No. 7,443,557.

(51) Int. Cl.
G02B 26/08 (2006.01)
(52) U.S. Cl. .................. 359/205.1; 359/208.1; 347/259
(58) Field of Classification Search ........................ None
See application file for complete search history.

(56) References Cited

U.S. PATENT DOCUMENTS

| 5,331,343 | A | 7/1994 | Ono et al. |
| 6,888,655 | B2 | 5/2005 | Yamaguchi |
| 7,443,557 | B2 * | 10/2008 | Yamaguchi .............. 359/205.1 |

| 2006/0066712 | A1 * | 3/2006 | Sakai .................. 347/244 |
| 2006/0132880 | A1 | 6/2006 | Amada et al. |

FOREIGN PATENT DOCUMENTS

| JP | 2002-328323 | 11/2002 |
| JP | 2005-024958 | 1/2005 |
| JP | 2005-049506 | 2/2005 |
| JP | 2005-049509 | 2/2005 |
| JP | 2005-062399 | 3/2005 |

OTHER PUBLICATIONS

Beiser, Laser Scanning Notebook, LSN-8-11/91, the Polygon Scanner, 1992.

* cited by examiner

Primary Examiner—James Phan
(74) Attorney, Agent, or Firm—Turocy & Watson, LLP

(57) ABSTRACT

An image forming apparatus provided with an optical beam scanning apparatus according to the invention includes a semiconductor laser device, a pre-deflection optical system, a polygon mirror, and a post-deflection optical system, wherein at least one imaging lens for imaging the luminous flux is provided in the post-deflection optical system includes; at least one projection on a vertical surface to a sub-scanning direction axis is provided in the imaging lens; and at least one positioning member having an engaging groove into which the projection is interfitted and which is engaged in a concave-convex shape is provided in the housing unit of the optical beam scanning apparatus. In accordance with an image forming apparatus according to the invention, in a scanning optical system using an imaging lens or an imaging mirror, influences against optical characteristics following an environmental fluctuation or a change with time can be reduced.

30 Claims, 16 Drawing Sheets

INCIDENT SURFACE

| CUY | CYZ | AY | AZ |
|---|---|---|---|
| -6.19E-03 | -7.12E-03 | 1 | 1 |

| n \ m | 1 | 2 | 3 | 4 | 5 | 6 | 7 | 8 | 9 | 10 |
|---|---|---|---|---|---|---|---|---|---|---|
| 0 | 0.00E+00 | -1.54E-03 | -2.07E-07 | 1.18E-07 | 5.92E-12 | -5.89E-12 | -2.33E-15 | 3.31E-16 | -1.28E-19 | -1.93E-20 |
| 1 | 1.34E-02 | -1.25E-06 | -2.09E-07 | 1.11E-10 | -5.79E-14 | -8.30E-15 | -1.04E-17 | 4.72E-19 | 1.31E-21 | 2.24E-23 |
| 2 | 2.26E-05 | -1.73E-09 | 3.62E-12 | -1.18E-13 | -1.23E-15 | 2.14E-17 | -3.94E-21 | 8.65E-21 | 1.92E-23 | -1.93E-25 |

EMITTING SURFACE

| CUY | CYZ | AY | AZ |
|---|---|---|---|
| 3.26E-03 | 2.76E-02 | 1 | 1 |

| n \ m | 1 | 2 | 3 | 4 | 5 | 6 | 7 | 8 | 9 | 10 |
|---|---|---|---|---|---|---|---|---|---|---|
| 0 | 0.00E+00 | -1.69E-03 | -1.85E-07 | 6.45E-08 | -6.44E-12 | -3.12E-12 | 3.44E-16 | 1.40E-16 | -3.37E-19 | -1.74E-20 |
| 1 | 3.37E-03 | -7.72E-07 | -2.46E-10 | 6.75E-11 | 2.42E-14 | -1.50E-15 | -1.30E-17 | -1.04E-19 | 3.36E-22 | 4.27E-23 |
| 2 | 5.30E-06 | 7.69E-10 | 2.42E-13 | 1.44E-13 | 1.32E-16 | -2.28E-17 | -1.32E-19 | 3.18E-21 | 1.54E-23 | 3.40E-25 |

FIG. 4

THE CASE WHERE POSITIONING IS PERFORMED IN AN END OF LENS (a)

———— AT THE TIME OF NORMAL TEMPERATURE
----- AT THE TIME OF EXPANSION
(AT THE TIME OF AN INCREASE OF TEMPERATURE)

THE CASE WHERE POSITIONING IS PERFORMED
IN THE VICINITY OF A CENTER OF LENS (b)

———— AT THE TIME OF NORMAL TEMPERATURE
----- AT THE TIME OF EXPANSION
(AT THE TIME OF AN INCREASE OF TEMPERATURE)

OPTICAL BEAM SCANNING APPARATUS AND IMAGE FORMING APPARATUS

CROSS-REFERENCE TO RELATED APPLICATIONS

This application claims the benefit of priority from and is a Continuation of application Ser. No. 11/694,532, now U.S. Pat. No. 7,443,557, filed on Mar. 30, 2007, the entire contents of which are incorporated herein by reference.

BACKGROUND OF THE INVENTION

1. Technical Field of the Invention

The present invention relates to an optical beam scanning apparatus and an image forming apparatus provided with this optical scanning apparatus. In particular, the invention relates to an optical beam scanning apparatus capable of positioning an imaging lens or an imaging mirror used in a scanning optical system within a housing unit and an image forming apparatus provided with this optical beam scanning apparatus.

2. Related Art

In recent years, in image forming apparatus of an electrophotographic mode, for example, laser printers, digital copiers and laser facsimiles, an optical beam scanning apparatus for irradiating laser light (optical beam) on a surface of a photoconductive drum and scanning the laser light to form an electrostatic latent image on the photoconductive drum is provided.

Recently, in order to devise to realize high-speed scanning on a surface of a photoconductive drum, for example, a method in which plural light sources (laser diodes) are provided in one laser unit, thereby increasing the number of laser light (multibeam mode) is proposed. In this multibeam method, plural beams for every color component emitted from each of light sources (for example, yellow, magenta, cyan, and black) are processed in a pre-deflection optical system and converted into one beam, which is then made incident on a polygon mirror. The beam deflected by the polygon mirror is mediated through an fθ lens configuring a post-deflection optical system and subsequently separated into a beam for every color component and irradiated on a photoconductive drum of every color component.

Here, the rotation axis direction of the polygon mirror as a deflector is defined as "sub-scanning direction", and a direction vertical to each of the optical axis direction of the optical system and the rotation axis direction of the deflector (polygonal mirror) is defined as "main scanning direction". Incidentally, the sub-scanning direction in the optical system is corresponding to a conveyance direction of a transfer material in an image forming apparatus, and the main scanning direction in the optical system is corresponding to a direction vertical to the conveyance direction within a surface of the transfer material in the image forming apparatus. Also, an image surface shows the surface of the photoconductive drum, and an imaging surface shows a surface on which a luminous flux (laser light) actually forms an image.

In general, a relation expressed by [Expression 1] is present among an image processing rate (paper conveyance rate), an image resolution, a motor rotation rate and a number of polygon mirror surfaces.

$$P*R = \frac{25.4*Vr*N}{60} \quad \text{[Expression 1]}$$

In the foregoing expression, P (mm/s) represents a processing rate (paper conveyance rate); and R (dpi) represents an image resolution (number of dots per inch). Also, Vr (rpm) represents a number of revolutions of polygon motor; and N represents a number of polygon mirror surfaces.

As expressed by the foregoing [Expression 1], the printing speed and resolution in the image forming apparatus are proportional to the number of revolutions of polygon motor (Vr) and the number of polygon mirror surfaces (N). Accordingly, in order to realize high resolution as well as high speed in the image forming apparatus, it is necessary to increase the number of polygon mirror surfaces (N) or to raise the number of revolutions of polygon motor (Vr).

However, in a conventional general underillumination scanning optical system, a width of a luminous flux (laser light) made incident on a polygon mirror in a main scanning direction is made smaller than a width of one reflecting surface forming the polygon mirror in the main scanning direction (reflection width) thereby reflecting the whole of the luminous flux (laser light) made incident on the polygon mirror.

However, since not only a beam diameter on the image surface is proportional to an F number, but also the F number is expressed by Fn=f/D wherein f represents a focal distance of the imaging optical system, and D represents a beam diameter of the main scanning direction on the polygon mirror surface, when it is intended to make the beam diameter on the image surface small for the purpose of devising to realize high image quality, the beam diameter of the main scanning direction on the polygon mirror surface must be made large.

In other words, in order to obtain high image quality at a certain fixed level or more, there is a restriction that the beam diameter of the main scanning direction on the polygon mirror surface must be regulated to a fixed size or more.

Nevertheless, in order to realize high resolution as well as high speed, when it is intended to increase the number of polygon mirror surfaces (N), the polygon mirror itself must be increased in size. As a result, when it is intended to rotate a large-sized polygon mirror at a high speed, a load to a motor for driving the polygon mirror becomes large, and the motor cost increases. In addition, at the same time, the noise or vibration of the motor or the generation of a heat becomes large, and a countermeasure thereto becomes necessary separately.

Then, an image forming apparatus using an over-illumination scanning optical system is proposed in place of the underillumination scanning optical system. In the overillumination scanning optical system, a width of a luminous flux made incident on a polygon mirror is made wider than a width of one reflecting surface forming the polygon mirror.

According to this, it is possible to reflect the luminous flux by using the entire surface of the reflecting surface forming the polygon mirror (or plural reflecting surfaces); and even in the case where it is intended to ensure the beam diameter on the polygon mirror surface while increasing the number of reflecting surfaces of polygon mirror (N) for the purpose of devising to realize high resolution as well as high speed, it is possible to make the diameter of the polygon mirror itself small. Accordingly, a load to a motor for driving the polygon mirror can be reduced, and the motor cost can be reduced. Also, since not only the diameter of the polygon mirror itself can be made small, but also the number of reflecting surfaces can be increased, it is possible to make the shape of the polygon mirror close to a circle, and it is possible to make the air resistance at the time of driving the polygon mirror low. As a result, even when the polygon mirror is rotated in a high speed, it is possible to reduce the noise or vibration and the generation of a heat.

Furthermore, following the reduction in the noise or vibration and the generation of heat, the whole or a part of countermeasures parts for reducing the noise or vibration, such as glasses, become unnecessary, and the costs in manufacturing an image forming apparatus can be lowered. Also, a high duty cycle becomes possible.

The foregoing overillumination scanning optical system is described in, for example, Leo Beiser, *Laser Scanning Notebook*, SPIE OPTICAL ENGINEERING PRESS.

In a scanning optical system using an imaging lens (for example, an fθ lens) or an imaging mirror (for example, an fθ mirror), when it is intended to perform positioning in a main scanning direction between this imaging lens or imaging mirror and a housing unit in one end, in the case where an environmental fluctuation (for example, a temperature fluctuation and a humidity fluctuation) within the housing unit is generated, because of the matter that the imaging lens or imaging mirror expands or shrinks, the position of the imaging lens or imaging mirror largely fluctuates in only an end opposite to the end at which the positioning has been performed, whereby the optical characteristics are deteriorated.

On the other hand, if it is intended to perform positioning in a main scanning direction between this imaging lens or imaging mirror and a housing unit in the both ends, in the case where the imaging lens or imaging mirror is configured of a single sheet and is a lens or a mirror with a thick or uneven thickness, since a large load is applied in the vicinity of a central part of the imaging lens or imaging mirror, the shape is deformed due to long-term use, whereby the optical characteristics are deteriorated.

Then, for example, by providing a flange in the imaging lens, it is possible to perform positioning in the main scanning direction between the imaging lens and the housing unit by using this flange. However, when a flange is provided in the imaging lens, fluidity at the time of molding a resin is lowered, whereby an error in the shape of an imaging lens to be molded becomes large.

SUMMARY OF THE INVENTION

In view of such circumstances, the invention has been made and is aimed to provide an optical beam scanning apparatus which in a scanning optical system using an imaging lens or an imaging mirror, is able to reduce influences against optical characteristics following an environmental fluctuation or a change with time and an image forming apparatus provided with this optical scanning apparatus.

In order to solve the foregoing problems, an optical beam scanning apparatus according to an aspect of the invention is an optical beam scanning apparatus including a light source for emitting a luminous flux, a pre-deflection optical system for forming a luminous flux emitted from the light source to image the luminous flux as a line image in a direction corresponding to a main scanning direction, a scanning unit configured to scan the imaged luminous flux by the pre-deflection optical system against a scanning subject, and a post-deflection optical system for imaging the luminous flux scanned by the scanning unit on the scanning subject, wherein at least one optical parts for imaging the luminous flux scanned from the scanning unit on the scanning subject is provided in the post-deflection optical system; at least one projection on a vertical surface to a sub-scanning direction axis formed by an effective region through which the luminous flux passes is provided in the optical parts; and at least one positioning member having an engaging groove into which the projection is interfitted and which is engaged in a concave-convex shape in the main scanning direction against the housing unit is provided while being made opposing to the projection in the housing unit of the optical beam scanning apparatus.

In order to solve the foregoing problems, an image forming apparatus according to an aspect of the invention is an image forming apparatus provided with an optical beam scanning apparatus including a light source for emitting a luminous flux, a pre-deflection optical system for forming a luminous flux emitted from the light source to image the luminous flux as a line image in a direction corresponding to a main scanning direction, a scanning unit configured to scan the imaged luminous flux by the pre-deflection optical system against a scanning subject, and a post-deflection optical system for imaging the luminous flux scanned by the scanning unit on the scanning subject, wherein at least one optical parts for imaging the luminous flux scanned from the scanning unit on the scanning subject is provided in the post-deflection optical system; at least one projection on a vertical surface to a sub-scanning direction axis formed by an effective region through which the luminous flux passes is provided in the optical parts; and at least one positioning member having an engaging groove into which the projection is interfitted and which is engaged in a concave-convex shape in the main scanning direction against the housing unit is provided while being made opposing to the projection in the housing unit of the optical beam scanning apparatus.

In the optical beam scanning apparatus according to an aspect of the invention, in the optical beam scanning apparatus including a light source for emitting a luminous flux, a pre-deflection optical system for forming a luminous flux emitted from the light source to image the luminous flux as a line image in a direction corresponding to a main scanning direction, a scanning unit configured to scan the imaged luminous flux by the pre-deflection optical system against a scanning subject, and a post-deflection optical system for imaging the luminous flux scanned by the scanning unit on the scanning subject, at least one optical parts for imaging the luminous flux scanned from the scanning unit on the scanning subject is provided in the post-deflection optical system; at least one projection on a vertical surface to a sub-scanning direction axis formed by an effective region through which the luminous flux passes is provided in the optical parts; and at least one positioning member having an engaging groove into which the projection is interfitted and which is engaged in a concave-convex shape in the main scanning direction against the housing unit is provided while being made opposing to the projection in the housing unit of the optical beam scanning apparatus.

In the image forming apparatus according to an aspect of the invention, in image forming apparatus provided with an optical beam scanning apparatus including a light source for emitting a luminous flux, a pre-deflection optical system for forming a luminous flux emitted from the light source to image the luminous flux as a line image in a direction corresponding to a main scanning direction, a scanning unit configured to scan the imaged luminous flux by the pre-deflection optical system against a scanning subject, and a post-deflection optical system for imaging the luminous flux scanned by the scanning unit on the scanning subject, at least one optical parts for imaging the luminous flux scanned from the scanning unit on the scanning subject is provided in the post-deflection optical system; at least one projection on a vertical surface to a sub-scanning direction axis formed by an effective region through which the luminous flux passes is provided in the optical parts; and at least one positioning member having an engaging groove into which the projection is interfitted and which is engaged in a concave-convex shape in the main scanning direction against the housing unit is provided while being made opposing to the projection in the housing unit of the optical beam scanning apparatus.

BRIEF DESCRIPTION OF THE DRAWINGS

In the accompanying drawings,

FIG. 4 is a diagram to show respective factors of a surface shape of an imaging lens;

DETAILED DESCRIPTION OF THE PREFERRED EMBODIMENTS

Embodiments of the invention are hereunder described with reference to the drawings.

Figure 1:
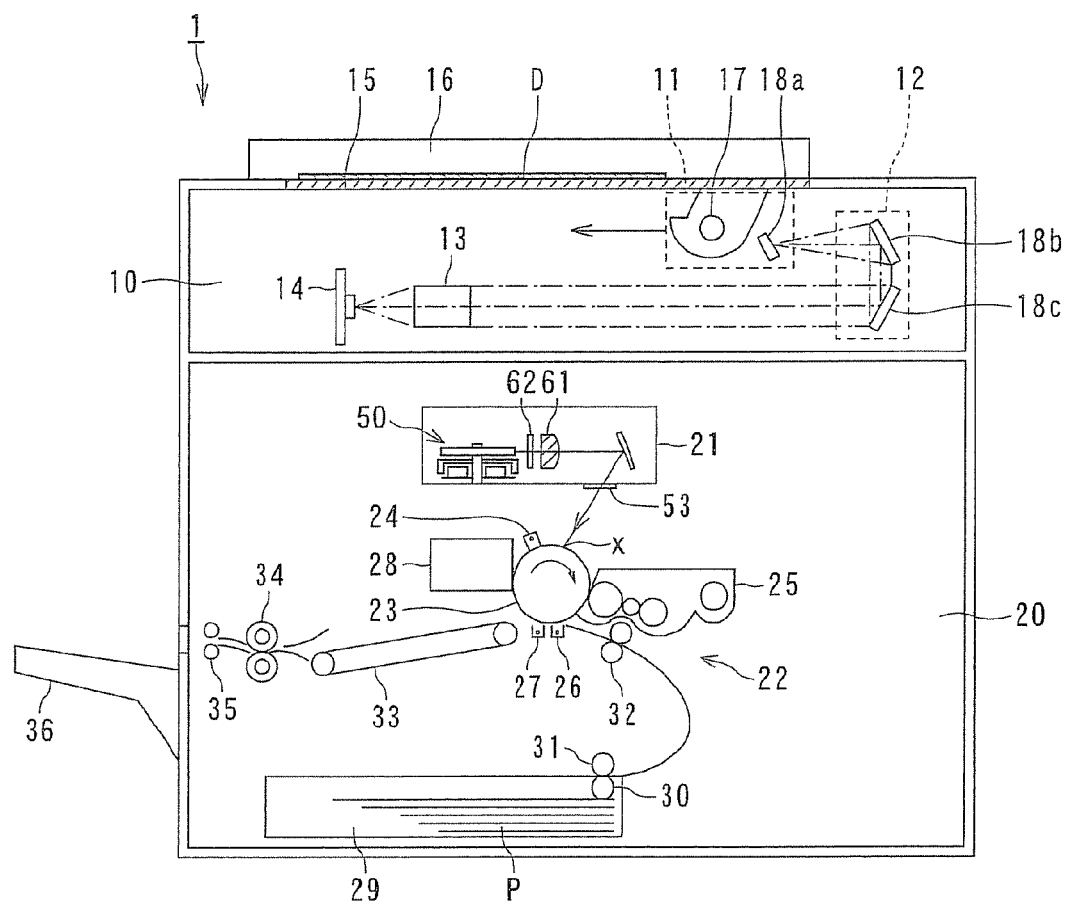
FIG. 1 is a view to show a configuration of an image forming apparatus provided with an optical beam scanning apparatus according to the invention.

FIG. 1 shows a configuration of an image forming apparatus 1 provided with an optical beam scanning apparatus 21 according to the invention.

As illustrated in FIG. 1, the image forming apparatus 1 includes, for example, a scanner section 10 as an image reading unit and a printer section 20 as an image forming unit.

The scanner section 10 has a first carriage 11 formed movably into an arrow direction; a second carriage 12 to be moved following the first carriage 11; an optical lens 13 for imparting a prescribed imaging characteristic to light from the second carriage 12; a photoelectric conversion device 14 for not only photoelectrically converting the light to which a prescribed imaging characteristic has been imparted by the optical lens 13 but outputting an electric signal after the photoelectric conversion; an original table 15 for holding an original D; an original fixing cover 16 for fixing the original D by pressing it onto the original table 15, and the like.

The first carriage 11 is provided with a light source 17 for illuminating the original D and a mirror 18a for reflecting catoptric light reflected from the original D upon illumination with light emitted from the light source 17 towards the second carriage 12.

The second carriage 12 has a mirror 18b for bending light guided from the mirror 18a of the first carriage 11 by 90° and a mirror 18c for further bending the light which has been bent by the mirror 18b by 90°.

The original D placed on the original table 15 is illuminated by the light source 17, thereby reflecting catoptric light where light and shade of light corresponding to the presence or absence of an image is distributed. This catoptric light due to the original D is made incident and guided as image information of the original D into the optical lens 13 via the mirrors 18a, 18b and 18c.

The catoptric light guided into the optical lens 13 from the original D is collected on a light-receiving surface of the photoelectric conversion device (for example, a CCD sensor) 14 by the optical lens 13.

Then, when an indication to start the image formation is inputted from a non-illustrated operation panel or external apparatus, the first carriage 11 and the second carriage 12 are once moved to a home position which is determined in advance so as to have a prescribed positional relation to the original table 15 by drive of a non-illustrated carriage driving motor.

Thereafter, when the first carriage 11 and the second carriage 12 are moved along the original table 15 at a prescribed rate, not only the image information of the original D, namely the catoptric light (image light) reflected from the original D is cut out in a prescribed width along a direction where the mirror 18a is extended, namely a main scanning direction and reflected towards the mirror 18b, but the catoptric light reflected from the original D is successively taken out in units of a width cut out from the mirror 18a with respect to a direction orthogonal to the direction where the mirror 18a is extended, namely a sub-scanning direction. According to this, all the image information of the original D is guided into the photoelectric conversion device 14. Incidentally, an electric signal outputted from the photoelectric conversion device 14 is an analogue signal and is converted into a digital signal by a non-illustrated A/D converter and temporarily stored as an image signal in a non-illustrated image memory.

Thus, the image of the original D placed on the original table 15 is converted into a digital image signal of, for example, 8 bits exhibiting light and shape of an image in a non-illustrated image processing section for every one line along the first direction where the mirror 18a is extended by the photoelectric conversion device 14.

Figure 2:
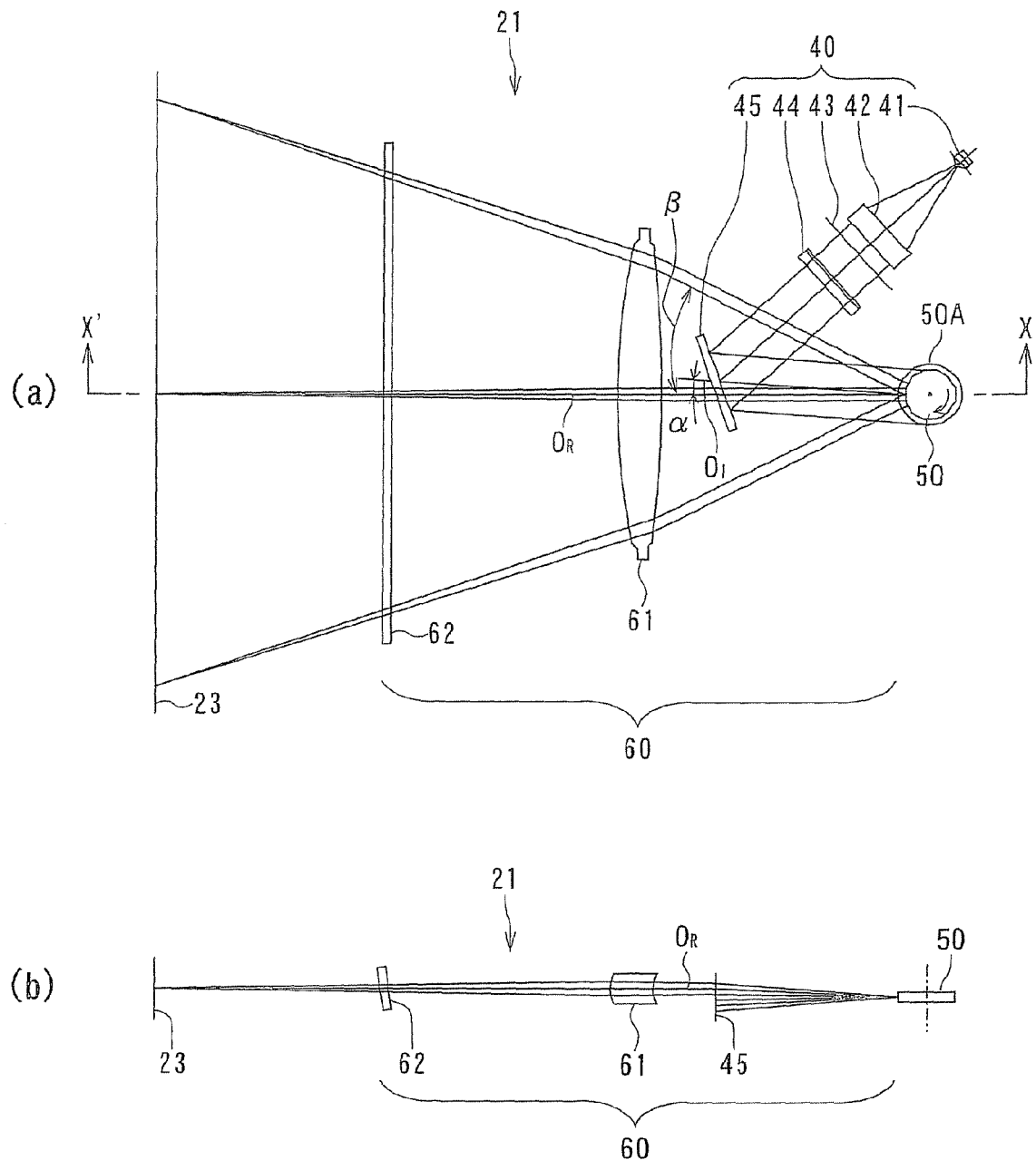
FIG. 2 is a view to show a detailed configuration of the optical beam scanning apparatus of FIG. 1.

The printer section 20 has the optical beam scanning apparatus 21 as an exposure apparatus as explained later by referring to FIG. 2 and FIG. 3 and an image forming section 22 of an electrophotographic mode capable of forming an image on recording paper P as a medium on which an image is formed.

Figure 3:
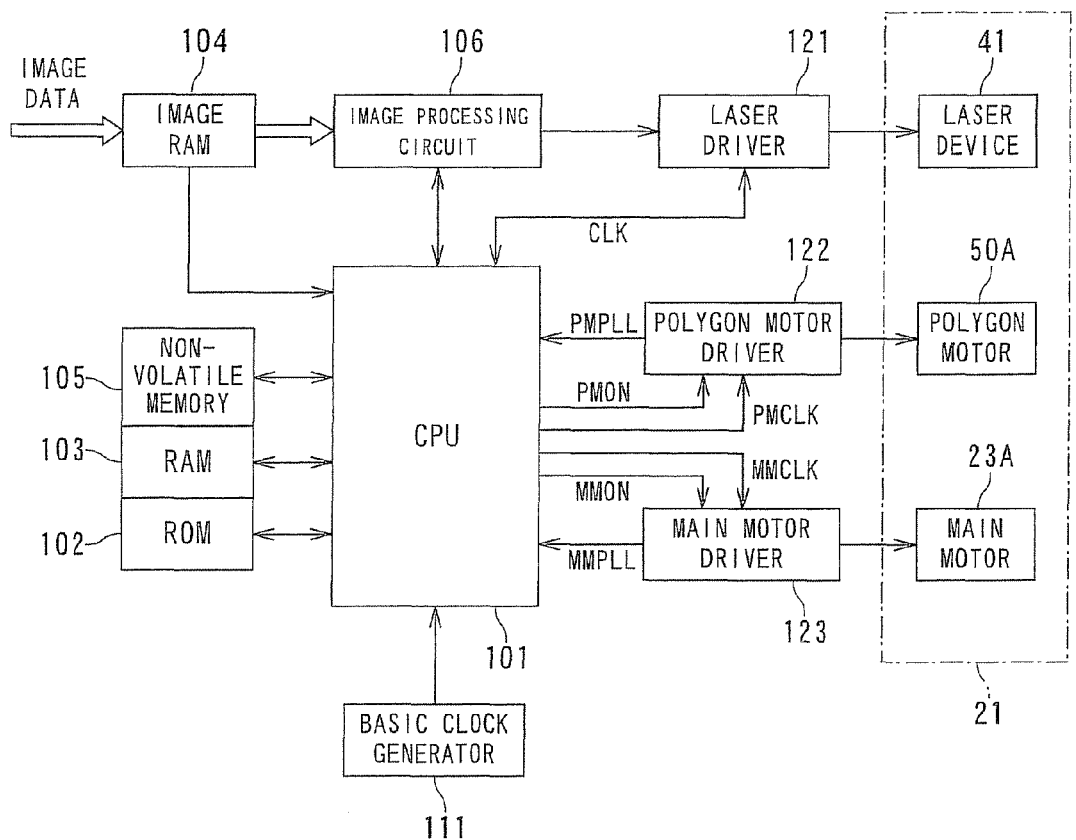
FIG. 3 is a view to show an outline configuration of the inside of a control system of an image forming apparatus provided with the optical beam scanning apparatus of FIG. 2.

The image forming section 22 is rotated by a main motor 23A such that an outer peripheral surface is moved at a prescribed rate as explained by referring to FIG. 3. The image forming section 22 has a drum-like photoconductor (hereinafter referred to as "photoconductive drum") 23 on which an electrostatic latent image is formed corresponding to an image data, namely the image of the original D upon irradiation with a laser beam (laser light) L from the optical beam scanning apparatus 21; a charging apparatus 24 for giving a surface potential of a prescribed polarity to a surface of the photoconductive drum 23; a development apparatus 25 for selectively feeding a toner as a visualizing material to the electrostatic latent image on the photoconductive drum 23 formed by the optical beam scanning apparatus and developing it; a transfer apparatus 26 for giving a prescribed electric field to a toner image formed on the outer periphery of the photoconductive drum 23 by the development apparatus 25 and transferring it onto the recording paper P; a separation apparatus 27 for releasing the recording paper P onto which the toner image has been transferred by the transfer apparatus 26 and the toner between the recording paper P and the photoconductive drum 23 from electrostatic adsorption with the photoconductive drum 23 and separating them from the photoconductive drum 23; and a cleaning apparatus 28 for removing the transfer residual toner remaining on the outer peripheral surface of the photoconductive drum 23 and returning the potential distribution of the photoconductive drum 23 to a state before the surface potential is fed by the charging apparatus 24; and the like.

Incidentally, the charging apparatus 24, the development apparatus 25, the transfer apparatus 26, the separation apparatus 27 and the cleaning apparatus 28 are disposed in this order along an arrow direction in which the photoconductor drum 23 is rotated. Also, the laser beam L from the optical beam scanning apparatus 21 is irradiated in a prescribed position X on the photoconductive drum 23 between the charging apparatus 24 and the development apparatus 25.

In a non-illustrated image processing section, an image signal read from the original D in the scanner section 10 is not only converted into a printing signal by processing, for example, contour correction or gradation processing for half tone display but converted into a laser modulation signal for changing a light intensity of the laser beam L emitted from a semiconductor laser device (semiconductor laser device 41 of FIG. 2) of the optical beam scanning apparatus 21 as described later to any one of an intensity at which an electrostatic latent image can be recorded on the outer periphery of the photoconductive drum 23 to which a prescribed surface potential is given by the charging apparatus 24 or an intensity at which the latent image is not recorded.

Each semiconductor laser device (semiconductor laser device 41 of FIG. 2) provided in the optical beam scanning apparatus 21 is subjected to intensity modulation based on the foregoing laser modulation signal and emits light so as to record an electrostatic latent image in a prescribed position of the photoconductive drum 23 corresponding to a prescribed image data. This laser light from the semiconductor laser device is deflected in a first direction which is the same direction as a reading line of the scanner section 10 by a deflector (polygon mirror 50 as a deflector of FIG. 2) within the optical beam scanning apparatus 21 and irradiated in the prescribed position X on the outer periphery of the photoconductive drum 23.

Then, when the photoconductive drum 23 is rotated in the arrow direction at a prescribed rate, similar to the movement of the fist carriage 11 and the second carriage 12 of the scanner section 10 along the original table 7, a laser beam from the semiconductor laser device which is successively deflected by the deflector (polygon mirror 50 as a deflector of FIG. 2) within the optical beam scanning apparatus 21 is exposed at prescribed intervals on the outer periphery of the photoconductive drum 23 for every one line.

An electrostatic latent image corresponding to the image signal is thus formed on the outer periphery of the photoconductive drum 23.

The electrostatic latent image formed on the outer periphery of the photoconductive drum 23 is developed with a toner from the development apparatus 25. A toner image developed with the toner is not only conveyed to a position opposing to the transfer apparatus 26 due to the rotation of the photoconductive drum 23 but transferred onto the recording paper P which is fed by taking out a single sheet thereof from a paper cassette 29 by a paper feed roller 30 and a separation roller 31 and then adjusting the timing by aligning rollers 32, due to an electric field from the transfer apparatus 26.

The recording paper P onto which the toner image has been transferred is separated together with the toner by the separation apparatus 27 and guided into a fixation apparatus 34 by a conveyance apparatus 33.

The recording paper P guided into the fixation apparatus 34 is subjected to fixation of the toner (toner image) due to a heat and a pressure from the fixation apparatus 34 and then discharged into a tray 36 by paper discharge rollers 35.

On the other hand, the photoconductive drum 23 in which the toner image (toner) has been transferred onto the recording paper P by the transfer apparatus 26 is made opposed to the cleaning apparatus 28 due to the subsequent continuous rotation. Then, the transfer residual toner (residual toner) remaining on the outer peripheral surface of the photoconductive drum 23 is removed by the cleaning apparatus 28. Furthermore, the photoconductive drum 23 is returned to an initial state which is a state before feeding a surface potential by the charging apparatus 24. According to this, next image formation becomes possible.

By repeating the foregoing process, a continuous image forming action becomes possible.

Thus, when the image information is read in the scanner section 10 and the read image information is converted into a toner image in the printer section 20 and outputted onto the recording paper P, the original D set on the original table 15 is copied.

Incidentally, while the foregoing image forming apparatus 1 has been applied to a digital copier or the like, it is not limited to such case. For example, it may be applied to a printer apparatus in which an image reading section is not present or the like.

FIG. 2(a) and FIG. 2(b) each shows a detailed configuration of the optical beam scanning apparatus 21 of FIG. 1. Incidentally, FIG. 2(a) is an outline plan view in the case where plural optical elements disposed between a light source (semiconductor laser device 41) included in the optical beam scanning apparatus 21 and the photoconductive drum 23 (defined as "scanning subject") are viewed from an orthogonal direction (sub-scanning direction) to a main scanning direction which is a parallel direction to a direction in which laser light going from the polygon mirror 50 as a deflector towards the photoconductive drum 23 is scanned by the polygon mirror 50. FIG. 2(b) is an outline cross-sectional view of the optical beam scanning apparatus 21 on an X-X' line of FIG. 2(a).

As illustrated in FIG. 2(a) and FIG. 2(b), the optical beam scanning apparatus 21 has a pre-deflection optical system 40 having the semiconductor laser device 41 for emitting the laser beam (laser light) L of, for example, 658 nm; a collimation lens 42 for converting a cross-sectional beam shape of the laser beam L emitted from the semiconductor laser device 41 into convergent light or parallel light or divergent light; an aperture 43 for controlling the quantity of light (luminous flux width) of the laser beam L which has passed through the collimation lens 42 to a prescribed size; a cylindrical lens 44 which is given a positive power only in the sub-scanning direction for the purpose of arranging the cross-sectional shape of the laser beam L, the quantity of light of which has been controlled by the aperture 43, into a prescribed cross-sectional beam shape; a mirror 45 for bending the laser beam L from the semiconductor laser device 41, which has been arranged into a prescribed cross-sectional beam shape by a finite focal lens or the collimation lens 42, the aperture 43 and the cylindrical lens 44, in a prescribed direction; and the like.

The polygon mirror 50 integrally formed with a polygon mirror motor 50A rotating at a prescribed rate is provided In a direction where the laser beam L to which a prescribed cross-sectional beam shape has been given by the pre-deflection optical system 40 advances. The polygon mirror 50 scans the laser beam L, the cross-sectional beam shape of which has been arranged into the prescribed shape by the cylindrical lens 44, towards the photoconductive drum 23 positioned at a later stage.

A post-deflection optical system 60 for imaging the laser beam L which is continuously reflected on each of reflecting surfaces of the polygon mirror 50 in a generally straight line along an axis direction of the photoconductive drum 23 is provided between the polygon mirror 50 and the photoconductive drum 23. Incidentally, the "post-deflection optical system" in the embodiment of the invention means all of optical systems between the polygon mirror 50 and the photoconductive drum 23 and includes an optical system between the polygon mirror 50 and an imaging lens 61 and an optical system between the imaging lens 61 and the photoconductive drum 23.

The post-deflection optical system 60 is composed of an imaging lens (generally called as "fθ lens") 61; a dustproof glass 62 for preventing turnaround of the toner, dusts or paper powder or the like floating within the image forming section 22 into a non-illustrated housing of the optical beam scanning apparatus 21; and the like. The imaging lens 61 is able to irradiate the laser beam L continuously reflected on the individual reflecting surfaces of the polygon mirror 50 from one end to the other end of the longitudinal (axis) direction of the photoconductive drum 23 in the exposing position X as illustrated in FIG. 1 while making the position on the photoconductive drum 23 proportional to a rotation angle of each of the reflecting surface of the polygon mirror 50 upon irradiation on the photoconductive drum 23 and also to provide convergence properties to which a prescribed relation based on an angle at which the polygon mirror 50 is rotated so as to have a prescribed cross-sectional beam diameter in any position of the longitudinal direction on the photoconductive drum 23.

Incidentally, an optical path of the laser beam L from the semiconductor laser device 41 within the optical beam scanning apparatus 21 to the photoconductive drum 23 is bent within a non-illustrated housing of the optical beam scanning apparatus 21 by non-illustrated plural mirrors or the like. Also, the imaging lens 61 and at least one non-illustrated mirror may be integrally formed in advance by optimizing curvatures of the imaging lens 61 in the main scanning direction and the sub-scanning direction and an optical path between the polygon mirror 50 and the photoconductive drum 23.

Also, in the optical beam scanning apparatus 21 as illustrated in FIG. 2(a) and FIG. 2(b), when an axis $O_I$ along a principal ray of the laser beam L made incident on each of the reflecting surfaces of the polygon mirror 50 and an optical axis $O_R$ of the post-deflection optical system 60 are each projected on a main scanning plane on the photoconductive drum 23, an angle α formed by the both is 5°, whereas a scanning angle β of a half-image region is 26°. Also, in the optical beam scanning apparatus 21 as illustrated in FIG. 2(a) and FIG. 2(b), an angle formed by the laser beam L made incident and the optical axis $O_R$ of the post-deflection optical system 60 is 2°.

Next, FIG. 3 shows an outline configuration of the inside of a control system of the image forming apparatus 1 including the optical beam scanning apparatus 21 as illustrated in FIG. 2(a) and FIG. 2(b).

A CPU (central processing unit) 101 as a main control apparatus is connected with a ROM (read only memory) 102 storing a prescribed operation rule or initial data; a RAM (random access memory) 103 for temporarily storing an inputted control data, a result of arithmetic processing by the CPU 101, or the like; an image RAM 104 for not only holding an image data from the photoelectric conversion device 14 or an image data fed from an external apparatus but outputting an image data to an image processing circuit 106; an NVM (non-volatile memory) 105 for holding a data which has been stored so far even in the case where electricity to the image forming apparatus 1 is blocked due to battery backup; the image processing circuit 106 for subjecting the image data stored in the image RAM 104 to prescribed image processing, and then outputting it to a laser driver 121; and the like.

Also, the CPU 101 is connected with the laser driver 121 for making the semiconductor laser device 41 of the optical beam scanning apparatus 21 emit light; a polygon motor driver 122 for driving the polygon motor 50A for rotating the polygon mirror 50; a main motor driver 123 for driving the main motor 23A for driving the photoconductive drum 23, a conveyance mechanism of the recording paper P or the like; and the like.

In the optical beam scanning apparatus 21, the divergent laser beam L emitted from the semiconductor laser device 41 is converted into convergent light, parallel light or divergent light with respect to the cross-sectional beam shape by the lens 42.

The laser beam L, the cross-sectional beam shape of which has been converted into a prescribed shape, passes through the aperture 43, whereby not only the luminous flux width and the quantity of light are optimally set up, but prescribed convergence properties are given only in the sub-scanning direction by the cylindrical lens 44. According to this, the laser beam L becomes linear (line image) extending in the main scanning direction on each of the reflecting surfaces of the polygon mirror 50.

The polygon mirror 50 is, for example, a regular dodecahedron and is formed so as to have an inscribed circle diameter Dp of about 25 mm. When the number of reflecting surfaces of the polygon mirror 50 is defined as N, a width Wp of the main scanning direction of each of the reflecting surfaces (12 surfaces) of the polygon mirror 50 can be determined as expressed by [Expression 2].

$$Wp = \tan(\pi/N) \times Dp \qquad \text{[Expression 2]}$$

In the case of the embodiment of the invention, the width Wp of the main scanning direction of each of the reflecting surfaces (12 surfaces) of the polygon mirror 50 is Wp=tan(π/12)×25=6.70 mm.

On the other hand, a beam width $D_L$ of the main scanning direction of the laser beam L irradiated on each of the reflecting surfaces of the polygon mirror 50 is generally 32 mm and is set up widely as compared with the width Wp=6.70 mm of the main scanning direction of the individual reflecting surfaces of the polygon mirror 50. By setting up the beam width $D_L$ of the main scanning direction of the laser beam L widely in the main scanning direction, it is possible to reduce scattering in the quantity of light between the scanning end and the scanning center on the image surface (photoconductive drum 23).

The laser beam L which has been scanned (deflected) in a straight line upon being guided onto each of the reflecting surfaces of the polygon mirror 50 and then continuously reflected due to the rotation of the polygon mirror 50 is imparted a prescribed imaging characteristic by the imaging lens 61 of the post-deflection optical system 60 such that the cross-sectional beam diameter is generally uniform in at least the main scanning direction on the photoconductive drum 23 (image surface) and imaged in a generally straight line on the surface of the photoconductive drum 23.

Also, the rotation angle of the individual reflecting surfaces of the polygon mirror 50 and the scanning position (imaging position) of the light beam imaged on the photoconductive drum 23 are corrected by the imaging lens 61 so as to have a proportional relation with each other. Accordingly, the speed of the light beam which is scanned in a straight line on the photoconductive drum 23 becomes constant over the entire scanning region by the imaging lens 61. Incidentally, in the imaging lens 61, the respective reflecting surfaces of the polygon mirror 50 are individually non-parallel to the sub-scanning direction, namely a curvature (curvature of the sub-scanning direction) capable of correcting a deviation of the scanning position in the sub-scanning direction due to an influence caused by the generation of inclination on each of the reflecting surfaces is imparted. Furthermore, an image surface curve of the sub-scanning direction is corrected, too. In order to correct these optical characteristics, the curvature of the sub-scanning direction is changed by the scanning position.

The shape of the lens surface of the imaging lens 61 has numerical values as shown in, for example, FIG. 4 and is defined according to [Expression 3].

$$X = \frac{CUY * y^2 + CUZ * z^2}{1 + \sqrt{1 - AY * CUY^2 * y^2 - AZ * CUZ^2 * z^2}} + \sum_{n=0}\sum_{m=0} A_{mn} y^m z^{2n}$$

[Expression 3]

By using such imaging lens 61, the rotation angle θ of the individual reflecting surfaces of the polygon mirror 50 and the position of the laser beam L to be imaged on the photoconductive drum 23 are made generally proportional to each other, it is possible to correct the position when the laser beam L is imaged on the photoconductive drum 23.

Also, the imaging lens 61 is able to correct a deviation of the inclination of the sub-scanning direction of the mutual respective reflecting surfaces of the polygon mirror 50, namely a deviation of the position of the sub-scanning direction caused due to scattering in the amount of surface inclination.

Concretely, by making the laser beam incident surface (the side of the polygon mirror 50) and the emitting surface (the side of the photoconductive drum 23) of the imaging lens 61 have a generally optical conjugated relation, even in the case where an inclination defined between an arbitrary reflecting surface of the polygon mirror 50 and the rotation axis of the polygon mirror 50 defers in every reflecting surface, it is possible to correct a deviation of the scanning position of the sub-scanning direction of the laser beam L guided onto the photoconductive drum 23.

Incidentally, since the cross-sectional beam diameter of the laser beam L replies upon a wavelength of the light beam L emitted from the semiconductor laser device 41, when the wavelength of the laser beam L is set up at 785 nm, it is possible to make the cross-sectional beam diameter of the laser beam L large. Also, by setting up the wavelength at 630 nm or shorter, it is possible to make the cross-sectional beam diameter of the laser beam L smaller.

The reflection mirror after the deflection is configured of a plane surface, and correction of the surface inclination is performed only by the imaging lens 61.

As a matter of course, the surface shape of the imaging lens 61 may be, for example, a toric lens having a rotation symmetrical axis to the main scanning axis and having a varied curvature of the sub-scanning direction depending upon the scanning position. According to this, a refractive power of the sub-scanning direction varies depending upon the scanning position, and a scanning line curvature can be corrected. Furthermore, in the case where the curved surface of the sub-scanning direction has a rotation symmetrical axis, a degree of freedom of the curvature of the sub-scanning direction is widened, and it is possible to achieve the correction more precisely.

Figure 5:
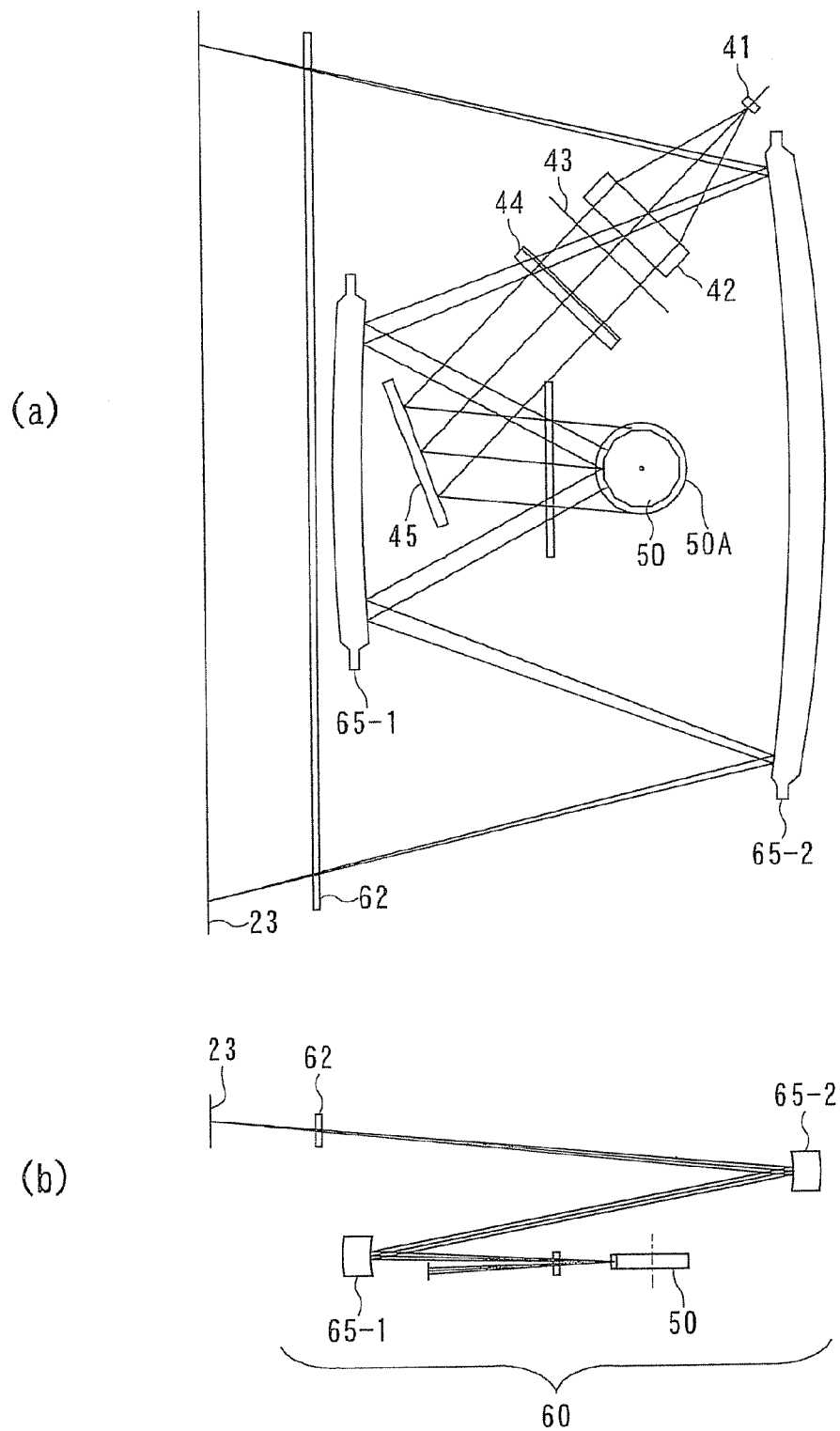
FIG. 5 is a view to show a detailed configuration of an optical beam scanning apparatus in the case of using an imaging mirror.

Also, for example, as illustrated in FIGS. 5(*a*) and 5(*b*), imaging mirrors 65-1 and 65-2 having a power may be used in place of the imaging lens 61.

Figure 6:
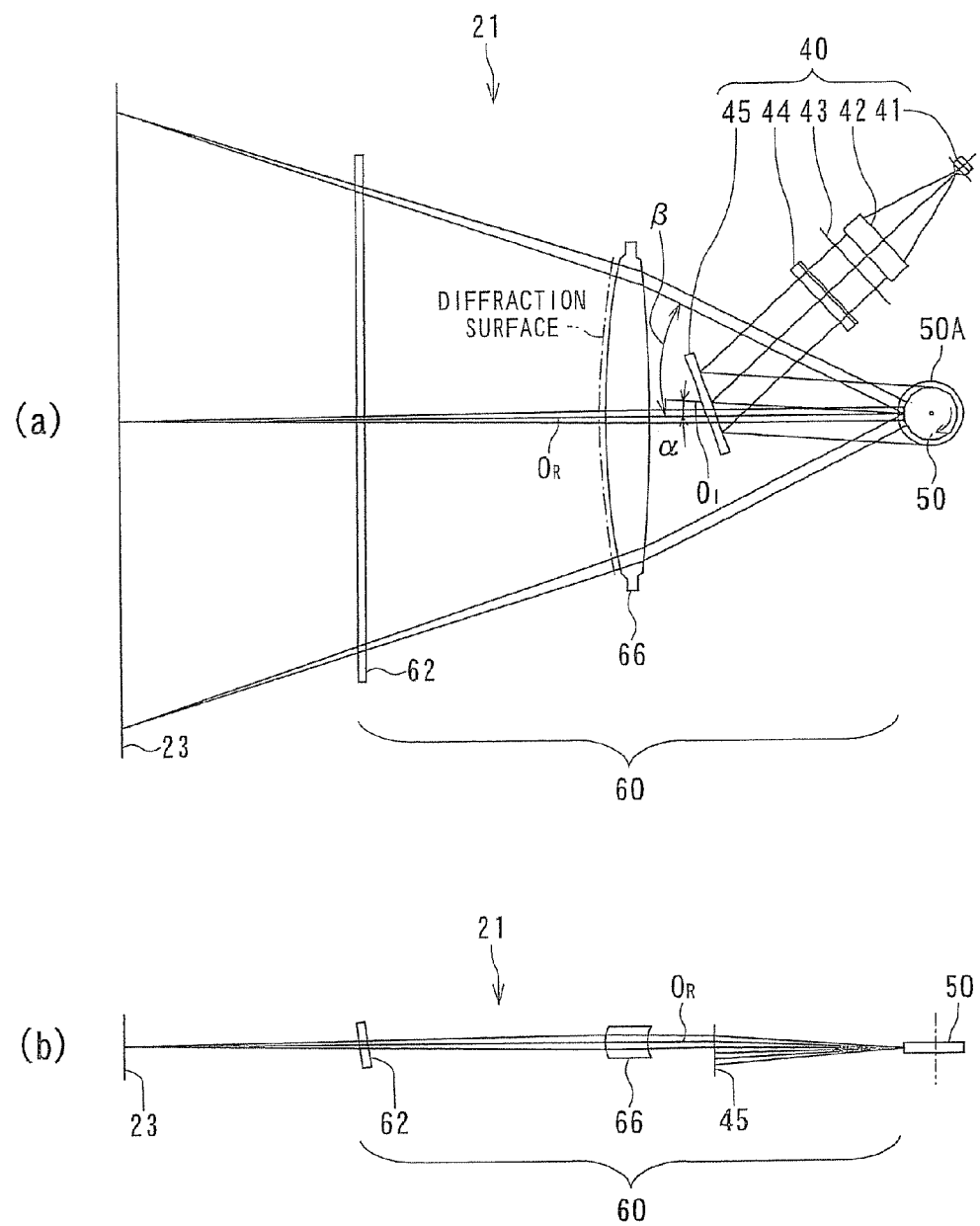
FIG. 6 is an explanatory view to explain an imaging lens including a surface having a diffraction surface.

Here, for example, as in an imaging lens 66 as illustrated in FIGS. 6(*a*) and 6(*b*), the imaging lens 61 which is included in the post-deflection optical system 60 may include a surface having a diffraction surface (diffraction optical device). According to this, the influence due to an environmental fluctuation can be reduced. Incidentally, in the case of the imaging lens 66 as illustrated in FIGS. 6(*a*) and 6(*b*), the diffraction surface is provided only in a side of the emitting surface, but the diffraction surface may be provided in a side of the incident surface or on the both surfaces. As a matter of course, the same is also applicable in the case where plural imaging lenses are configured. Also, not only the imaging lens but other optical device may be provided.

Figure 7:
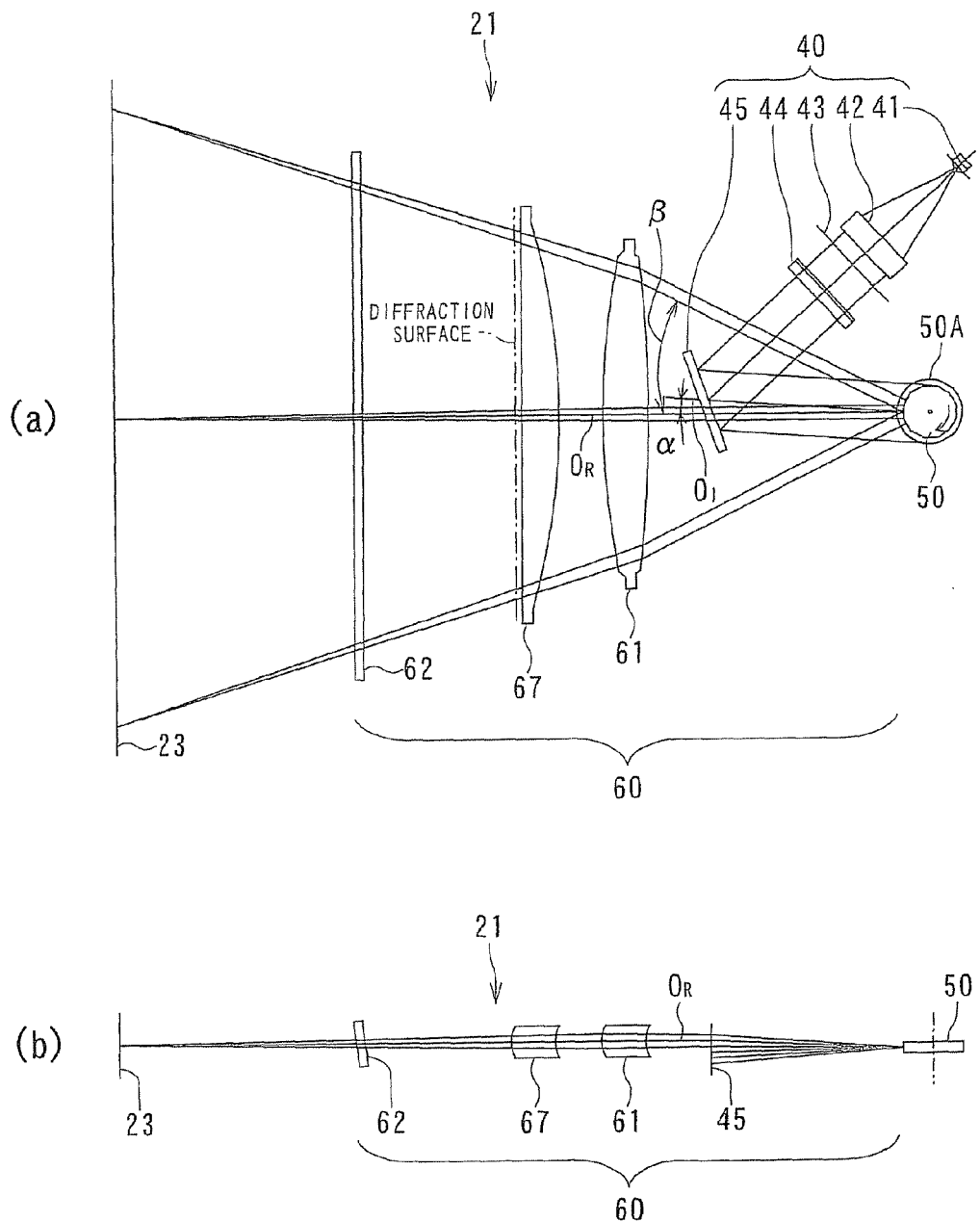
FIG. 7 is an explanatory view to explain other imaging lens including a surface having a diffraction surface.

Also, in general, for example, as in an imaging lens 67 as illustrated in FIGS. 7(*a*) and 7(*b*), the diffraction surface is provided on a plane surface. But, for example, as in the imaging lens 66 as illustrated in FIGS. 6(*a*) and 6(*b*), by imparting it to a surface with a power, it is possible to reduce the number of lenses. Furthermore, by bringing a power by a diffraction optical device, it is possible to reduce a fluctuation in the wall thickness or to make the wall thickness thin; and it is possible to improve the productivity and the precision and to reduce the cost due to shortening of a molding time.

Figure 8:
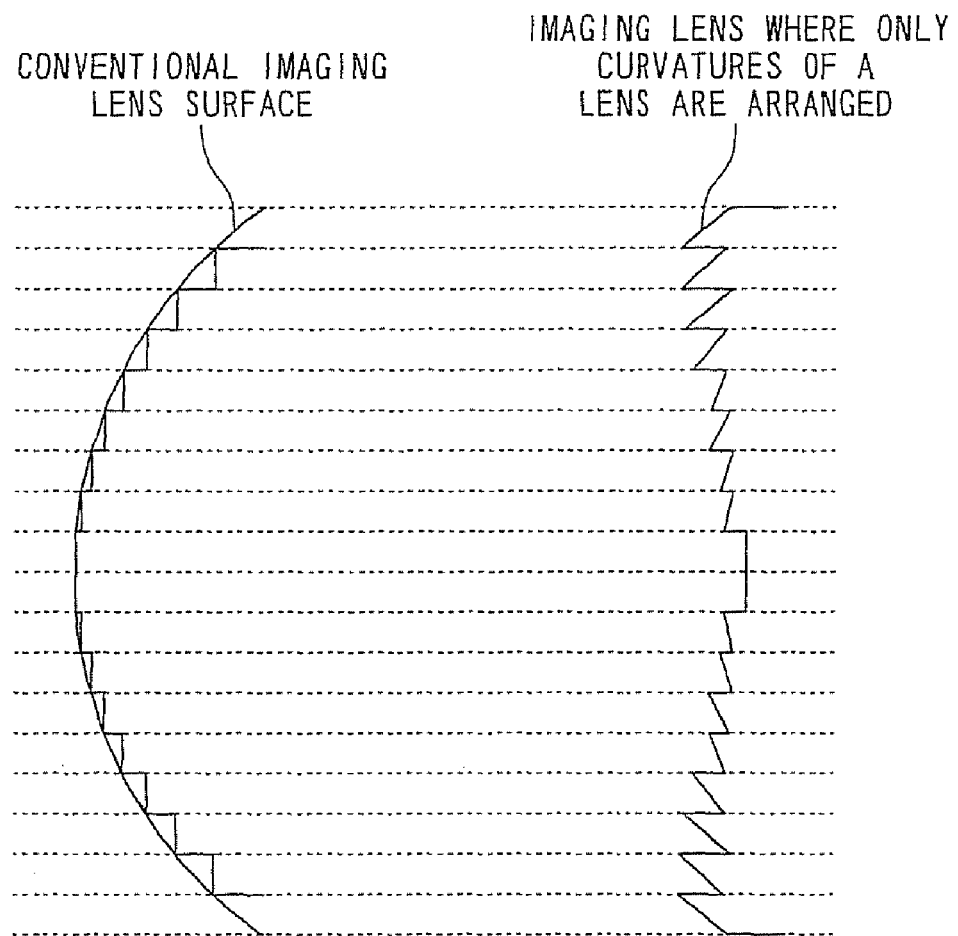
FIG. 8 is an explanatory view to explain an imaging lens where only curvatures of a lens are arranged.
Figure 9:
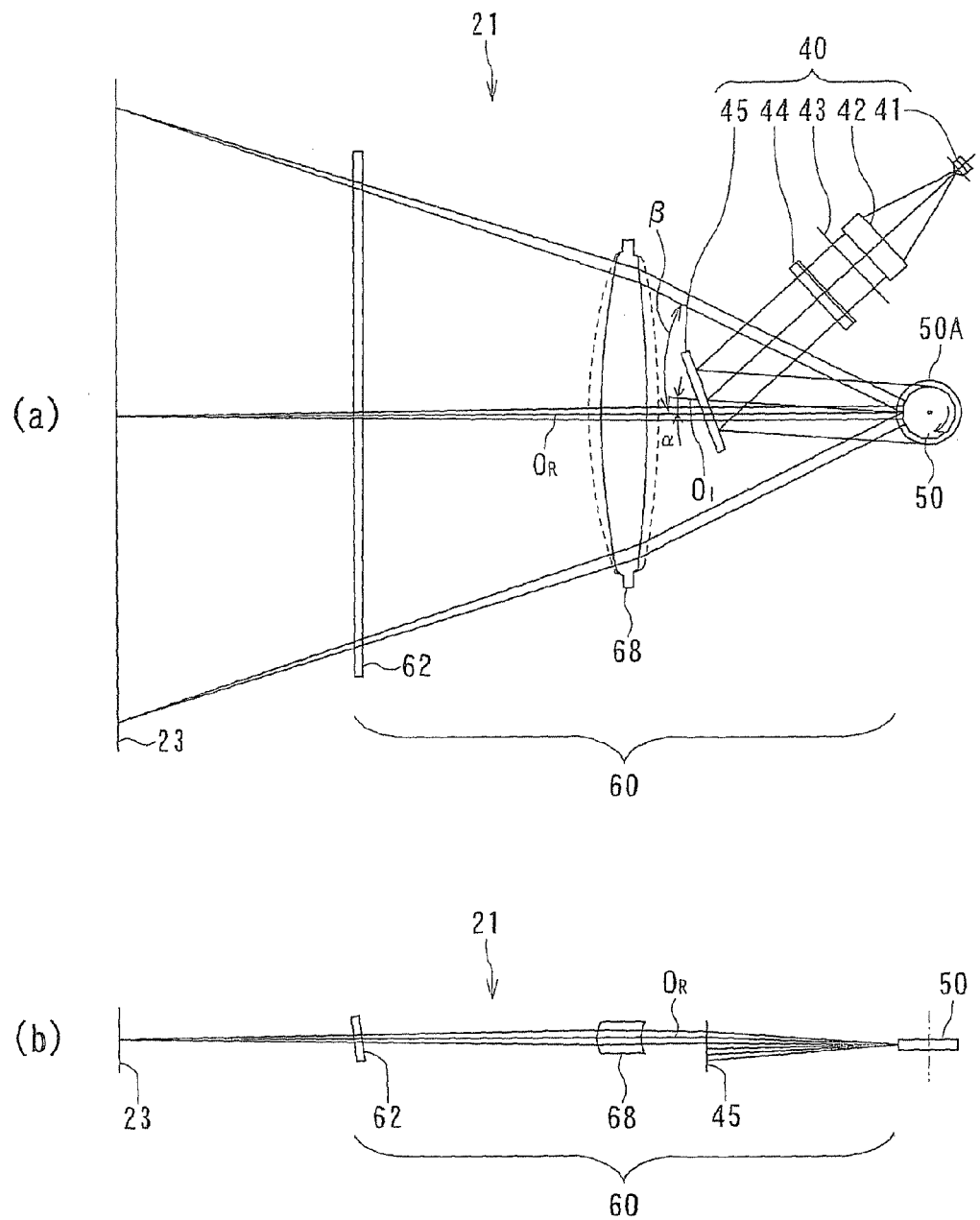
FIG. 9 is an explanatory view to explain other imaging lens including a surface having a diffraction surface.

That is, for example, as illustrated in FIG. 8, by arranging only curvatures of lens having a power of the conventional imaging lens 61, it is possible to reduce a fluctuation in the wall thickness and to make the wall thickness thin while having a lens action. According to this, as in an imaging lens 68 as illustrated in FIG. 9, the fluctuation in the wall thickness of lens can be reduced. Also, in the case where plural optical devices after the deflection are configured, the number of optical devices can be reduced.

Incidentally, a non-illustrated horizontal synchronous sensor is provided in an opposite side to the polygon mirror 50.

Figure 10:
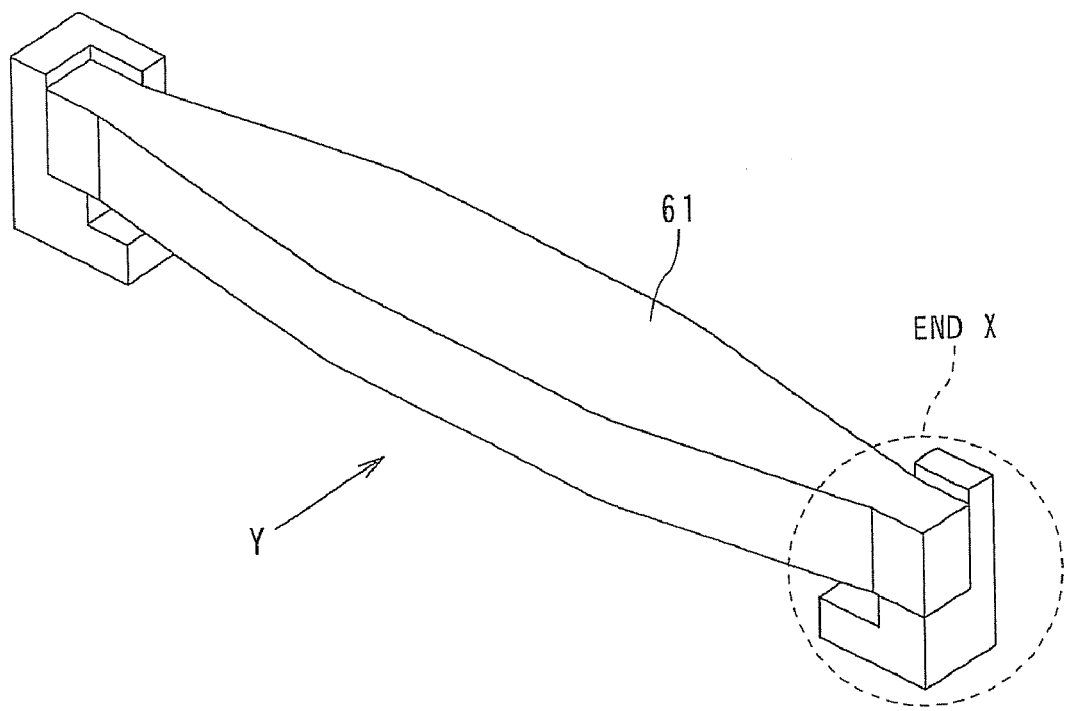
FIG. 10 is an oblique view in the case where positioning in a main scanning direction between an imaging lens and a housing unit of an image forming apparatus is performed in one end.

Now, in a scanning optical system using the imaging lens 61 (or the imaging mirrors 65-1 to 65-2), for example, as illustrated in FIG. 10, in the case where positioning in the main scanning direction between the imaging lens 61 and the image forming apparatus 1 (optical beam scanning apparatus 21) is performed in one end by a blade spring (not illustrated), bonding, or the like, when an environmental fluctuation (for example, a temperature fluctuation and a humidity fluctuation) within the housing unit is generated, by expansion or shrinkage of the imaging lens 61 (or the imaging mirrors 65-1 to 65-2), the position of the imaging lens 61 (or the imaging mirrors 65-1 to 65-2) largely fluctuates in only an end (an end X in FIG. 10) opposite to the end at which the positioning has been performed.

Figure 11:
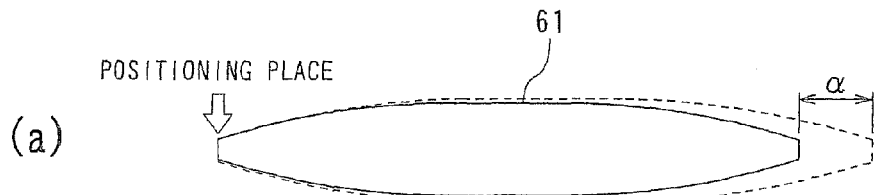
FIG. 11 is an explanatory view to explain a fluctuation of the position of an imaging lens (or an imaging mirror) following an environmental fluctuation.
Figure 11:
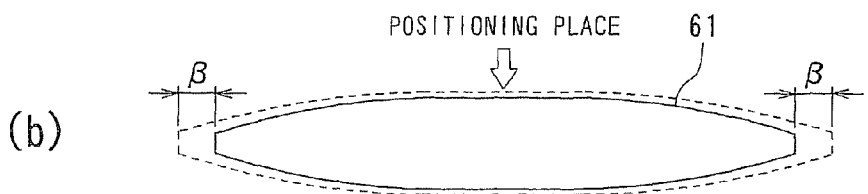

Concretely, for example, as illustrated in FIG. 11(a), in the case where the positioning is performed in one end of the imaging lens 61, the imaging lens 61 (or the imaging mirrors 65-1 to 65-2) expands following, for example, an increase of the temperature within the housing unit, whereby the position of the imaging lens 61 (or the imaging mirrors 65-1 to 65-2) deviates just by an expansion amount $\alpha$ as compared with the time at normal temperature in only an end (an end X in FIG. 10) opposite to the end at which the positioning has been performed. As a result, the optical characteristics are deteriorated.

On the other hand, in the case where it is intended to perform the positioning in the main scanning direction between the imaging lens 61 (or the imaging mirrors 65-1 to 65-2) and the housing unit in the both ends, when the imaging lens 61 is configured of a single sheet and is a lens with a thick or uneven thickness, since a large load is applied in the vicinity of the central part of the imaging lens 61, the shape is deformed due to long-term use (namely, the imaging lens 61 is warped), and the imaging lens 61 is deviated in the sub-scanning direction, whereby the optical characteristics are deteriorated.

Figure 12:
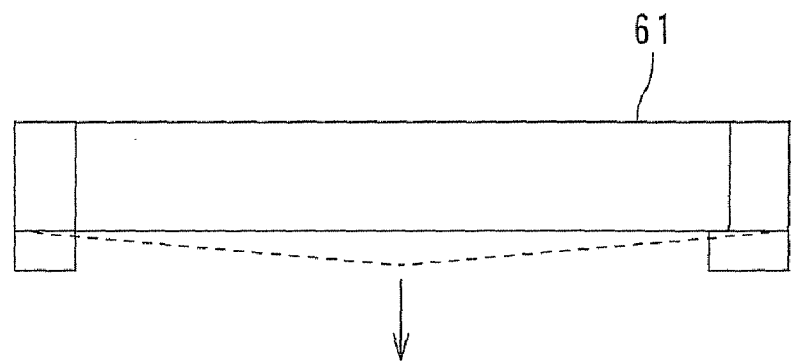
FIG. 12 is an explanatory view to explain a warp of an imaging lens following a change with time.

FIG. 12 is a front view in the case where the imaging lens 61 is seen from a direction as shown by an arrow Y in FIG. 10. As illustrated in FIG. 12, in the case where the imaging lens 61 is configured of a single sheet and is a lens with a thick or uneven thickness, since a large load is applied in the vicinity of the central part of the imaging lens 61, the shape is deformed from a solid line to a dotted line due to long-term use, and the imaging lens 61 is deviated in the sub-scanning direction, whereby the optical characteristics are deteriorated.

Figure 13:
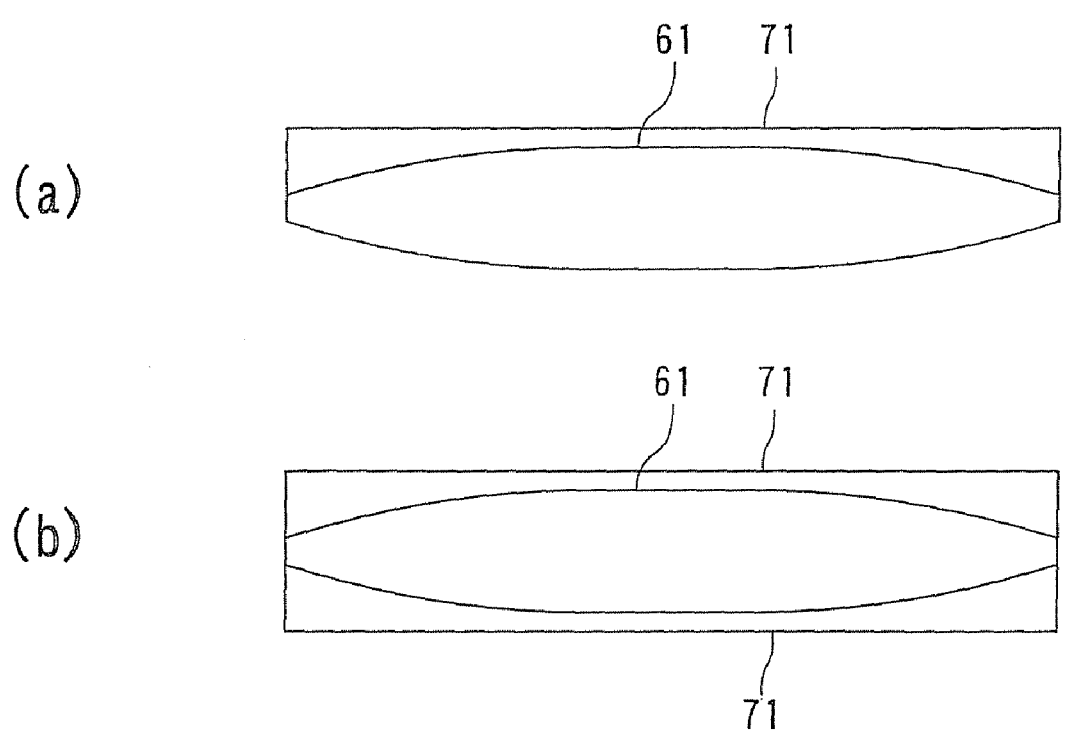
FIG. 13 is an explanatory view to explain an imaging lens (or an imaging mirror) provided with a flange.

On the other hand, for example, as illustrated in FIG. 13(a) or 13(b), by providing a flange 71 in the imaging lens 61, it is possible to perform positioning in the main scanning direction between the imaging lens 61 and the housing unit by using the flange 71. However, when the flange 71 is provided in the imaging lens 61, fluidity at the time of molding a resin is lowered, whereby an error in the shape of the imaging lens 61 to be molded becomes large.

Figure 14:
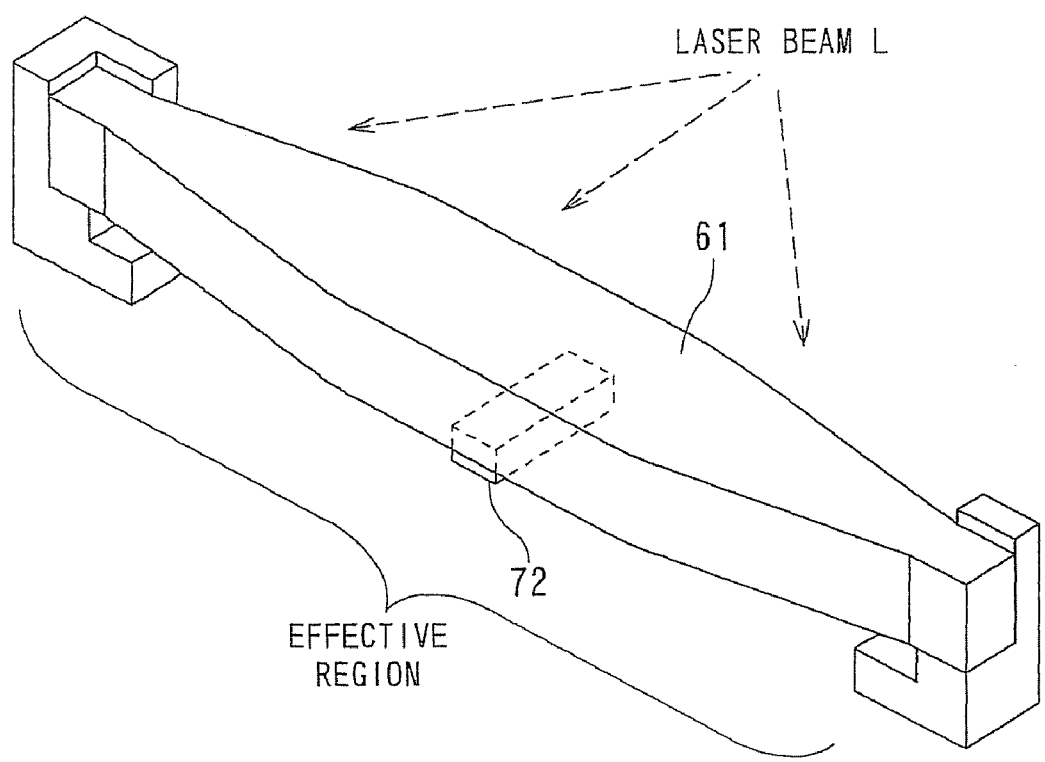
FIG. 14 is an explanatory view to explain an imaging lens (or an imaging mirror) provided with a projection.

Then, for example, as illustrated in FIG. 14, a projection 72 for positioning is provided in the vicinity of a central lower part of an effective region on the emitting surface of the imaging lens 61, and positioning in the main scanning direction in the vicinity of the central part of the imaging lens 61 is performed by using the provided projection 72. Incidentally, a region where a laser beam L as catoptric light reflected from the polygon mirror 50 effectively passes through the imaging lens 61 and forms an image on the photoconductive drum 23 is defined as the "effective region". In other words, the effective region means a region of the emitting surface of the imaging lens 61 from which the both ends are excluded. Also, more precisely, the "central lower part of an effective region on the emitting surface of the imaging lens 61" means a vertical surface to the sub-scanning direction axis formed by the effective region through which the laser beam L passes.

According to this, for example, as illustrated in FIG. 11(b), even when an environmental fluctuation (for example, a temperature fluctuation and a humidity fluctuation) is generated within the housing unit, since the imaging lens 61 (or the imaging mirrors 65-1 to 65-2) expands or shrinks bilaterally symmetrically centering on the vicinity of the central part, the position of the imaging lens 61 (or the imaging mirrors 65-1 to 65-2) is uniformly deviated just by an expansion amount $\beta$ as compared with the time of normal temperature in the both ends where the positioning is performed. As a result, it is possible to prevent the matter that the position of the imaging lens 61 is largely deviated only in one end where the positioning has been performed; and it is possible to prevent the deterioration of optical characteristics while suppressing influences following the environmental fluctuation.

Also, at the same time, because of the matter that a large load is applied in the vicinity of central lower part of the effective region of the imaging lens 61, it is possible to prevent the matter that the shape is deformed due to long-term use. As a result, it is possible to prevent the deterioration of optical characteristics following the deformation.

The positioning of the main scanning direction in the vicinity of the central lower part of the effective region of the imaging lens 61 (or the imaging mirrors 65-1 to 65-2) employing this method is hereunder described.

FIGS. 15(a) to 15(d) are each an explanatory view to explain a positioning method of the main scanning direction in the vicinity of the central lower part of the effective region of the imaging lens 61 (or the imaging mirrors 65-1 to 65-2) using the projection 72 for positioning in the vicinity of the central lower part of the effective region of the imaging lens 61.

Incidentally, FIG. 15(a) is an oblique view in performing the positioning of the main scanning direction in the vicinity of the central lower part of the effective region of the imaging lens 61 (or the imaging mirrors 65-1 to 65-2) using the projection 72 for positioning in the vicinity of the central lower part of the effective region of the imaging lens 61; and FIG. 15(b) is a front view in the case of seeing from an arrow X in FIG. 15(a). FIG. 15(c) is a cross-sectional view on a Y-Y' line in FIG. 15(a); and FIG. 15(d) is a cross-sectional view on a Z-Z' line in FIG. 15(a).

For example, as illustrated in FIGS. 15(a) to 15(d), by interfitting the projection 72 for positioning in the vicinity of the central lower part of the effective region of the imaging lens 61 into an engaging groove provided in advance to a positioning member 73, thereby engaging the projection 72 and the positioning member 73 with each other in a concave-convex shape; and simultaneously, by bringing the positioning member 73 into contact with the imaging lens 61, thereby supporting the imaging lens 61, the positioning of the main scanning direction is performed in the vicinity of the central lower part of the effective region of the imaging lens 61 (or the imaging mirrors 65-1 to 65-2).

Incidentally, at this time, the both ends of the imaging lens 61 are supported by being placed on an supporting member 74, whereby the imaging lens 61 is positioned in an advancing direction of the laser beam L (namely, the optical axis direction).

According to this, even when an environmental fluctuation (for example, a temperature fluctuation and a humidity fluctuation) is generated within the housing unit, since the imaging lens 61 (or the imaging mirrors 65-1 to 65-2) expands or shrinks bilaterally symmetrically centering on the vicinity of the central lower part, the position of the imaging lens 61 (or the imaging mirrors 65-1 to 65-2) is uniformly deviated just by an expansion amount β as compared with the time of normal temperature in the both ends where the positioning has been performed. As a result, it is possible to prevent the matter that the position of the imaging lens 61 is largely deviated only in one end where the positioning has been performed; and it is possible to prevent the deterioration of optical characteristics while suppressing influences following the environmental fluctuation.

Also, at the same time, because of the matter that a large load is applied in the vicinity of central lower part of the effective region of the imaging lens 61, it is possible to prevent the matter that the shape is deformed due to long-term use. As a result, it is possible to prevent the deterioration of optical characteristics following the deformation.

Accordingly, in the scanning optical system using the imaging lens 61 (or the imaging mirrors 65-1 to 65-2), influences against the optical characteristics following a environmental fluctuation or a change with time can be reduced. As a result, it is possible to improve an image quality at the time of image forming.

Figure 15:
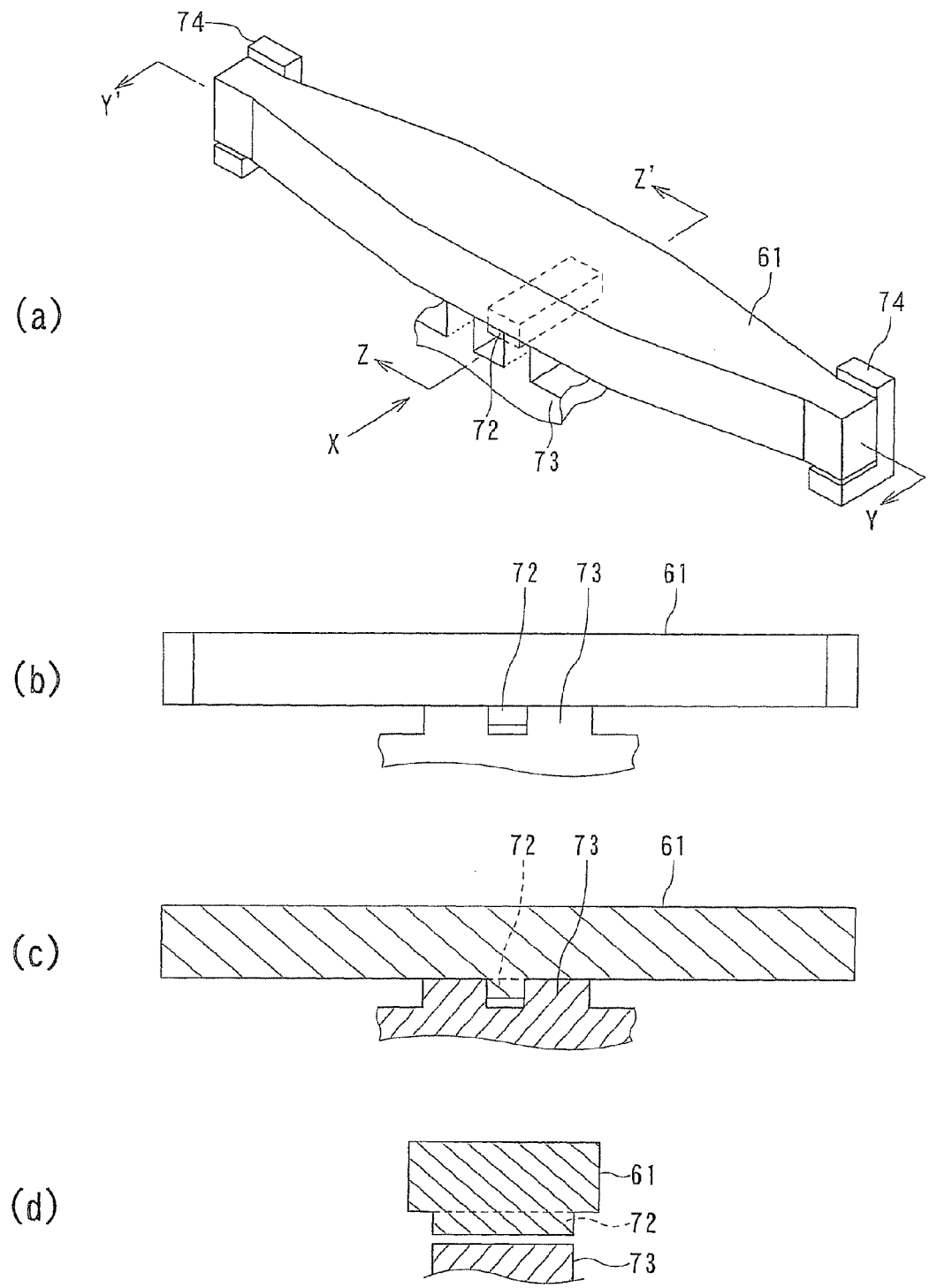
FIG. 15 is an explanatory view to explain a positioning method of an imaging lens (or an imaging mirror) using a projection.
Figure 16:
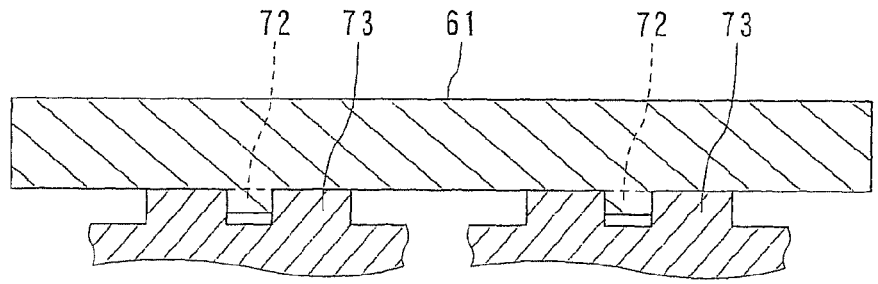
FIG. 16 is an explanatory view to explain a positioning method of an imaging lens (or an imaging mirror) using plural pairs of a projection and a positioning member.

Incidentally, in the case of an example of FIG. 15, though the positioning of the imaging lens 61 is performed by providing only one pair of the projection 72 of the imaging lens 61 and the positioning member 73 for interfitting the projection 72, the invention is not limited to such case. For example, as illustrated in FIG. 16, the positioning of the imaging lens 61 may be performed by providing plural pairs (for example, two pairs and three pairs). Incidentally, at this time, it is preferable that the position where the positioning is performed is provided at prescribed intervals such that a load applied to the imaging lens 61 does not become non-uniform.

Figure 17:
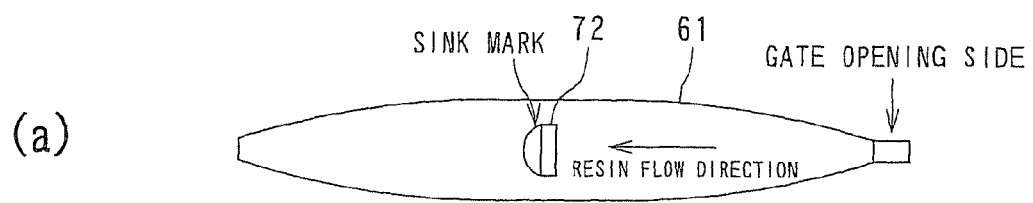
FIG. 17 is an explanatory view to explain a sink mark generated in the case of manufacturing an imaging lens by allowing a resin flow into a molding die through a side gate opening provided in advance to the molding die and then molding the resin into a prescribed shape.
Figure 17:
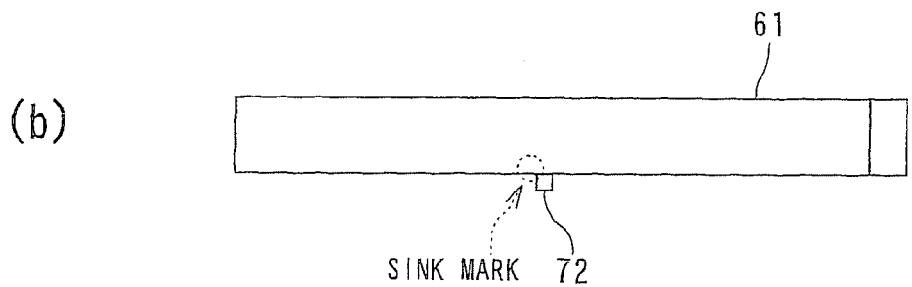
Figure 18:
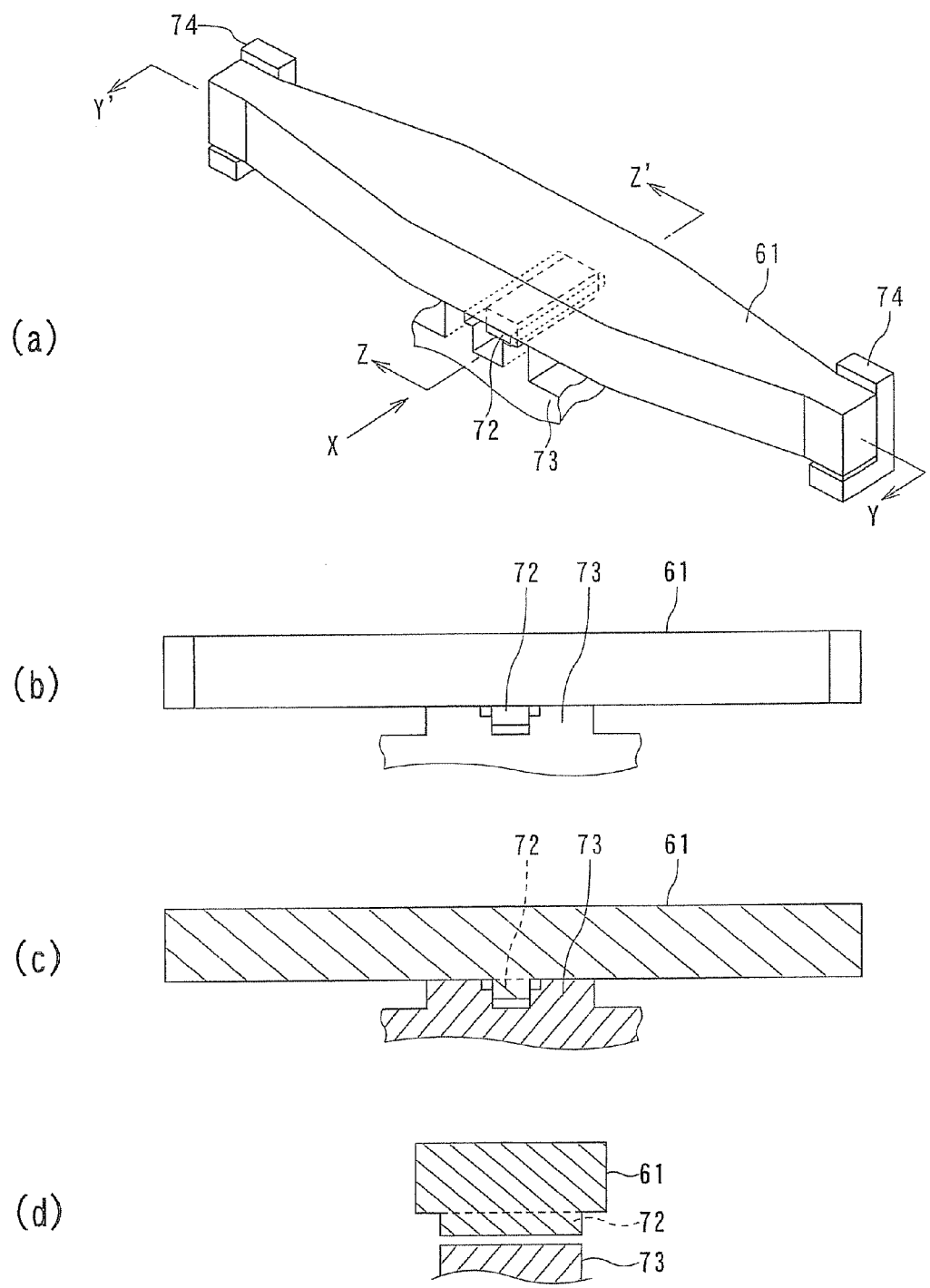
FIG. 18 is an explanatory view to explain a positioning method of an imaging lens (or an imaging mirror) using a projection in the case where sink mark is generated in the imaging lens.

Incidentally, in the case where the imaging lens 61 is manufactured by using a resin as a material of the imaging lens 61, allowing the resin flow into a molding die through a side gate opening provided in advance to the molding die and then molding the resin into a prescribed shape, when it is intended to provide the projection 72 in, for example, the vicinity of the central lower part of the effective region of the imaging lens 61, for example, as illustrated in FIGS. 17(a) and 17(b), the flow of the resin at the time of molding becomes complicated, whereby a sink mark may possibly be generated in a region in an opposite side to the side gate opening with respect to the projection 72.

In such case, for example, as illustrated in FIG. 15 or FIG. 16, when the projection 72 and the positioning member 73 are engaged in a concave-convex shape by interfitting the projection 72 provided in the imaging lens 61 into the positioning member 73 fixed in the housing unit of the image forming apparatus 1 (optical beam scanning apparatus 21), the concave-convex engagement with the positioning member 73 becomes instable due to the sink mark generated in the vicinity of the projection 72, whereby it becomes difficult to suitably bring the positioning member 73 into contact with the imaging lens 61.

As a result, the imaging lens 61 is inclined to the sub-scanning direction, and the positioning precision in the sub-scanning direction of the imaging lens 61 is deteriorated.

Then, for example, as illustrated in FIGS. 18(a) to 18(d), by interfitting the projection 72 provided in the imaging lens 61 into the positioning member 73 fixed in the housing unit of the image forming apparatus 1, the positioning member 73 is brought into contact with the imaging lens 61 in a portion other than the sink mark portion generated in the vicinity of the projection 72 in performing the concave-convex engagement between the projection 72 and the positioning member 73.

Concretely, even when the projection 72 and the positioning member 73 are engaged in a concave-convex shape, the shape of the positioning member 73 (namely, the shape of the engaging groove provided in advance to the positioning member 73) is formed in a shape such that a space is ensured in the vicinity of right and left of the projection 72.

According to this, even in the case where a sink mark is generated in the vicinity of the projection 72 of the imaging lens 61, it is possible to prevent the matter that the imaging lens 61 is inclined to the sub-scanning direction; and it is possible to prevent the deterioration of positioning precision in the sub-scanning direction of the imaging lens 61.

Accordingly, in the scanning optical system using the imaging lens 61 (or the imaging mirrors 65-1 to 65-2), not only the influences against the optical characteristics due to a sink mark generated in the imaging lens 61 at the time of molding or the like can be reduced, but influences against the optical characteristics following an environmental fluctuation or a change with time can be more reduced.

As a result, it is possible to improve an image quality at the time of image forming.

Incidentally, in the embodiment of the invention, while the invention has been applied to the overillumination scanning optical system, as a matter of course, the invention may be applied to the underillumination scanning system.

Furthermore, the number of a luminous flux from the light source may be one or plural.

What is claimed is:

1. An optical beam scanning apparatus comprising:
a housing unit having plural positioning members,
a light source configured to emit one or plural luminous fluxes,
a pre-deflection optical system configured to form a luminous flux emitted from the light source to image the luminous flux as a line image in a direction corresponding to a main scanning direction,
a scanning unit configured to scan the imaged luminous flux by the pre-deflection optical system against a scanning subject, and
a post-deflection optical system configured to image the luminous flux scanned by the scanning unit on the scanning subject, in which at least one optical parts configured to image the luminous flux scanned from the scanning unit on the scanning subject is provided, the optical parts having plural projections provided on a vertical surface to the sub-scanning direction formed in the effective region in the optical parts, through which the luminous flux passes, the projection being protruded in the sub-scanning direction, the respective projections being interfitted into an engaging groove to be a pair with the projection which the positioning member has and then engaged in a concave-convex shape with the housing unit in the main scanning direction, and the positioning member supporting the projection while being made opposing to the projection.

2. The optical beam scanning apparatus according to claim 1, wherein the both ends of the optical parts are excluded from the effective region through which the luminous flux passes in the optical parts.

3. The optical beam scanning apparatus according to claim 1, wherein a supporting member for supporting the optical parts in the optical axis direction after the both ends thereof are placed is further provided in the housing unit.

4. The optical beam scanning apparatus according to claim 1, wherein the optical parts is a lens or a mirror.

5. The optical beam scanning apparatus according to claim 1, wherein the optical parts is configured of a single lens.

6. An optical beam scanning apparatus comprising:
a housing unit having at least one positioning member,
a light source configured to emit one or plural luminous fluxes,
a pre-deflection optical system configured to form a luminous flux emitted from the light source to image the luminous flux emitted from the light source to image the luminous flux as a line image in a direction corresponding to a main scanning direction
a scanning unit configured to scan the imaged luminous flux by the pre-deflection optical system against a scanning subject, and
a post-deflection optical system configured to image the luminous flux scanned by the scanning unit on the scanning subject, in which at least one optical parts configured to image the luminous flux scanned from the scanning unit on the scanning subject is provided, the optical parts having at least one projection provided on a vertical surface to the sub-scanning direction formed in the effective region in the optical parts, through which the luminous flux passes, the projection being protruded in the sub-scanning direction, the optical parts being brought into contact with the sub-scanning direction by the positioning member in the concave-convex engagement between the projection and an engaging groove to be a pair with the projection which the positioning member has, and the positioning member supporting the projection while being made opposing to the projection.

7. The optical beam scanning apparatus according to claim 6, wherein the both ends of the optical parts are excluded from the effective region through which the luminous flux passes in the optical parts.

8. The optical beam scanning apparatus according to claim 6, wherein a supporting member for supporting the optical parts in the optical axis direction after the both ends thereof are placed is further provided in the housing unit.

9. The optical beam scanning apparatus according to claim 6, wherein the optical parts is a lens or a mirror.

10. The optical beam scanning apparatus according to claim 6, wherein the optical parts is configured of a single lens.

11. An optical beam scanning apparatus comprising:
a housing unit having at least one positioning member,
a light source configured to emit one or plural luminous fluxes,
a pre-deflection optical system configured to form a luminous flux emitted from the light source to image the luminous flux as a line image in a direction corresponding to a main scanning direction,
a scanning unit configured to scan the imaged luminous flux by the pre-deflection optical system against a scanning subject, and
a post-deflection optical system configured to image the luminous flux scanned by the scanning unit on the scanning subject, in which at least one optical parts configured to image the luminous flux scanned from the scanning unit on the scanning subject is provided, the optical parts having at least one projection provided on a vertical surface to the sub-scanning direction formed in the effective region in the optical parts, through which the luminous flux passes, the projection being protruded in the sub-scanning direction, the optical parts being brought into contact with the sub-scanning direction by the positioning member via a space in the vicinity of the projection in the concave-convex engagement between the projection and an engaging groove to be a pair with the projection which the positioning member has, and the positioning member supporting the projection while being made opposing to the projection.

12. The optical beam scanning apparatus according to claim 11, wherein the both ends of the optical parts are excluded from the effective region through which the luminous flux passes in the optical parts.

13. The optical beam scanning apparatus according to claim 11, wherein a supporting member for supporting the optical parts in the optical axis direction after the both ends thereof are placed is further provided in the housing unit.

14. The optical beam scanning apparatus according to claim 11, wherein the optical parts is a lens or a mirror.

15. The optical beam scanning apparatus according to claim 11, wherein the optical parts is configured of a single lens.

16. An image forming apparatus provided with an optical beam scanning apparatus comprising:
a housing unit of the optical beam scanning apparatus having plural positioning members,
a light source configured to emit one or plural luminous fluxes,
a pre-deflection optical system configured to form a luminous flux emitted from the light source to image the luminous flux emitted from the light source to image the luminous flux as a line image in a direction corresponding to a main scanning direction,
a scanning unit configured to scan the imaged luminous flux by the pre-deflection optical system against a scanning subject, and
a post-deflection optical system configured to image the luminous flux scanned by the scanning unit on the scanning subject, in which at least one optical parts configured to image the luminous flux scanned from the scanning unit on the scanning subject is provided, the optical parts having plural projections provided on a vertical surface to the sub-scanning direction formed in the effective region in the optical parts, through which the luminous flux passes, the respective projections being protruded in the sub-scanning direction, the respective projections being interfitted into an engaging groove to be a pair with the projection which the positioning member has and then engaged in a concave-convex shape with the housing unit in the main scanning direction, and the positioning member supporting the projection while being made opposing to the projection.

17. The optical beam scanning apparatus according to claim 16, wherein the both ends of the optical parts are excluded from the effective region through which the luminous flux passes in the optical parts.

18. The optical beam scanning apparatus according to claim 16, wherein a supporting member for supporting the optical parts in the optical axis direction after the both ends thereof are placed is further provided in the housing unit.

19. The optical beam scanning apparatus according to claim 16, wherein the optical parts is a lens or a mirror.

20. The optical beam scanning apparatus according to claim 16, wherein the optical parts is configured of a single lens.

21. An image forming apparatus provided with an optical beam scanning apparatus comprising:
   a housing unit of the optical beam scanning apparatus having at least one positioning member,
   a light source configured to emit one or plural luminous fluxes,
   a pre-deflection optical system configured to form a luminous flux emitted from the light source to image the luminous flux as a line image in a direction corresponding to a main scanning direction,
   a scanning unit configured to scan the imaged luminous flux by the pre-deflection optical system against a scanning subject, and
   a post-deflection optical system configured to image the luminous flux scanned by the scanning unit on the scanning subject, in which at least one optical parts configured to image the luminous flux scanned from the scanning unit on the scanning subject is provided, the optical parts having at least one projection provided on a vertical surface to the sub-scanning direction formed in the effective region in the optical parts, through which the luminous flux passes, the projection being protruded in the sub-scanning direction, the optical parts being brought into contact with the sub-scanning direction by the positioning member in the concave-convex engagement between the projection and an engaging groove to be a pair with the projection which the positioning member has, and the positioning member supporting the projection while being made opposing to the projection.

22. The optical beam scanning apparatus according to claim 21, wherein the both ends of the optical parts are excluded from the effective region through which the luminous flux passes in the optical parts.

23. The optical beam scanning apparatus according to claim 21, wherein a supporting member for supporting the optical parts in the optical axis direction after the both ends thereof are placed is further provided in the housing unit.

24. The optical beam scanning apparatus according to claim 21, wherein the optical parts is a lens or a mirror.

25. The optical beam scanning apparatus according to claim 21, wherein the optical parts is configured of a single lens.

26. An image forming apparatus provided with an optical beam scanning apparatus comprising
   a housing unit of the optical beam scanning apparatus having at least one positioning member,
   a light source configured to emit one or plural luminous fluxes,
   a pre-deflection optical system configured to form a luminous flux emitted from the light source to image the luminous flux as a line image in a direction corresponding to a main scanning direction,
   a scanning unit configured to scan the imaged luminous flux by the pre-deflection optical system against a scanning subject, and
   a post-deflection optical system configured to image the luminous flux scanned by the scanning unit on the scanning subject, in which at least one optical parts configured to image the luminous flux scanned from the scanning unit on the scanning unit on the scanning subject is provided, the optical parts having at least one projection provided on a vertical surface to the sub-scanning direction formed in the effective region in the optical parts, through which the luminous flux passes, the projection being protruded in the sub-scanning direction, the optical parts being brought into contact with the sub-scanning direction by the positioning member via a space in the vicinity of the projection in the concave-convex engagement between the projection and an engaging groove to be a pair with the projection which the positioning member has, and the positioning member supporting the projection while being made opposing to the projection.

27. The optical beam scanning apparatus according to claim 26, wherein the both ends of the optical parts are excluded from the effective region through which the luminous flux passes in the optical parts.

28. The optical beam scanning apparatus according to claim 26, wherein a supporting member for supporting the optical parts in the optical axis direction after the both ends thereof are placed is further provided in the housing unit.

29. The optical beam scanning apparatus according to claim 26, wherein the optical parts is a lens or a mirror.

30. The optical beam scanning apparatus according to claim 26, wherein the optical parts is configured of a single lens.

* * * * *